US010651514B2

(12) United States Patent
Liu et al.

(10) Patent No.: US 10,651,514 B2
(45) Date of Patent: May 12, 2020

(54) BATTERY CELL DESIGN FOR PREVENTING INTERNAL SHORT CIRCUITS FROM OCCURRING AND PROPAGATING USING POSITIVE TEMPERATURE COEFFICIENT (PTC) MATERIALS

(71) Applicant: The Boeing Company, Chicago, IL (US)

(72) Inventors: Shengyi Liu, Sammamish, WA (US); John A. Trela, Seattle, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 15/834,057

(22) Filed: Dec. 7, 2017

(65) Prior Publication Data

US 2018/0269535 A1    Sep. 20, 2018

Related U.S. Application Data

(63) Continuation-in-part of application No. 15/464,219, filed on Mar. 20, 2017.

(51) Int. Cl.
*H01M 10/42* (2006.01)
*H01M 10/65* (2014.01)
(Continued)

(52) U.S. Cl.
CPC ... *H01M 10/4207* (2013.01); *H01M 10/4235* (2013.01); *H01M 10/65* (2015.04);
(Continued)

(58) Field of Classification Search
CPC ......... H01M 10/4207; H01M 10/4235; H01M 10/65; H01M 10/0525; H01M 2200/103; H01M 2200/106; H01M 2004/028
See application file for complete search history.

(56) References Cited

U.S. PATENT DOCUMENTS

| 7,910,235 B2 | 3/2011 | Tsai | |
| 2010/0310940 A1* | 12/2010 | Kim | ....................... B82Y 30/00 |
| | | | 429/231.95 |

(Continued)

OTHER PUBLICATIONS

Energy Materials Center At Cornell, "Battery Anodes", Jan. 5, 2017, available via the Internet at web.archive.org/web/20170105180246/http://www.emc2.cornell.edu/content/view/battery-anodes.html (last visited on Mar. 20, 2017).

(Continued)

*Primary Examiner* — Muhammad S Siddiquee
(74) *Attorney, Agent, or Firm* — McDonnell Boehnen Hulbert & Berghoff LLP

(57) ABSTRACT

A battery and related methods are described. The battery can include a plurality of battery cell segments. Each of the battery cell segments can include: a positive temperature coefficient (PTC) material whose resistance increases with temperature, an anode segment, a cathode segment, and one or more current limiters. The one or more current limiters of a battery cell segment are configured to conditionally electrically isolate the battery cell segment based on an occurrence of a short circuit within the battery cell segment. The battery can be used to store electrical power and/or provide electrical power to a load.

20 Claims, 18 Drawing Sheets

(51) Int. Cl.
    *H01M 4/02*       (2006.01)
    *H01M 10/0525*    (2010.01)
(52) U.S. Cl.
    CPC .. *H01M 10/0525* (2013.01); *H01M 2004/028* (2013.01); *H01M 2200/103* (2013.01); *H01M 2200/106* (2013.01)

(56)            References Cited

U.S. PATENT DOCUMENTS

2013/0177785 A1    7/2013  Hwang
2016/0164064 A1*   6/2016  Lahiri ............... H01M 10/4235
                                                          429/61

OTHER PUBLICATIONS

S. Liu et al., "Battery Cell Design for Preventing Internal Short Circuits from Occurring and Propagating", U.S. Appl. No. 15/464,219, filed Mar. 30, 2017.
Resistor Guide, "PTC thermistor", Jan. 8, 2016, available via the Internet at web.archive.org/web/20160108180240/http://www.resistorguide.com/ptc-thermistor/ (last visited Dec. 6, 2017).
Wikimedia Foundation, "Lithium-ion Battery", Feb. 10, 2017, available via the Internet at en.wikipedia.org/w/index.php?title=Lithium-ion_battery&oldid=764663732 (last visited Mar. 20, 2017).
Wikimedia Foundation, "PTC Rubber", Sep. 8, 2017, available via the Internet at en.wikipedia.org/w/index.php?title=PTC_rubber&oldid=799617013 (last visited Oct. 30, 2017).
Wikimedia Foundation, "Thermistor", Oct. 11, 2017, available via the Internet at en.wikipedia.org/w/index.php?title=Thermistor&oldid=804813068 (last visited Oct. 30, 2017).

* cited by examiner

1400

1410 Store electrical power using a battery, the battery including: one or more cells, each cell including a plurality of battery cell segments, each battery cell segment including: an anode segment, a cathode segment, and one or more current limiters

1420 Conditionally electrically isolate a particular battery cell segment based on an occurrence of a short circuit within the particular battery cell segment

1510 Provide electrical power to a load using a battery, the battery including: one or more cells, each cell including a plurality of battery cell segments, each battery cell segment including: an anode segment, a cathode segment, and one or more current limiters

1520 Conditionally electrically isolate a particular battery cell segment based on an occurrence of a short circuit within the particular battery cell segment

1910 Store electrical power using a battery, the battery including: one or more cells, each cell including a plurality of battery cell segments, each battery cell segment including: a PTC material whose resistance increases with temperature, an anode segment, a cathode segment, and one or more current limiters 1920 Conditionally electrically isolate a particular battery cell segment based on an occurrence of a short circuit within the particular battery cell segment

2010 Provide electrical power to a load using a battery, the battery including: one or more cells, each cell including a plurality of battery cell segments, each battery cell segment including: a PTC material whose resistance increases with temperature, an anode segment, a cathode segment, and one or more current limiters 2020 Conditionally electrically isolate a particular battery cell segment based on an occurrence of a short circuit within the particular battery cell segment

BATTERY CELL DESIGN FOR PREVENTING INTERNAL SHORT CIRCUITS FROM OCCURRING AND PROPAGATING USING POSITIVE TEMPERATURE COEFFICIENT (PTC) MATERIALS

CROSS-REFERENCE TO RELATED APPLICATIONS

This application is a continuation-in-part to U.S. patent application Ser. No. 15/464,219, filed Mar. 20, 2017, the contents of which are fully incorporated by reference herein for all purposes.

FIELD

The present disclosure generally relates to electrical batteries, and more particularly to methods and apparatus related to batteries that have a plurality of battery cell segments.

BACKGROUND

Batteries are used to store and provide electrical power for aircraft, ground vehicles, personal electronic devices, and other electrically-powered devices. A battery can have a positive terminal or electrode and a negative terminal or electrode. Then, a "load" or device that draws power from the battery, can be connected via electrical conductors, such as wires, electrical contacts, and/or cables, to the positive terminal and the negative terminal in an electrical circuit. The battery can then operate in a discharge mode while providing power to the load. To charge the battery, a source of electrical power can be electrically connected to the positive terminal and the negative terminal in an electrical circuit, and the battery can operate in a charge mode to "charge" or draw and store power from the source. In some applications, as batteries used in vehicular and electrical power systems, the battery can be connected to one or more devices that can act as both a load and a source of electrical power to the rest of the car. While the car is being started, the rest of the car can act as a load to draw power from the car battery. After the car has started, an alternator and/or regenerative braking system of the car can act as a source of electrical power to charge the battery.

In some cases, batteries can fail due to environmental conditions, faults in the construction and/or design of the battery, physical damage to the battery, and the (gradual) deterioration of chemicals by the battery to store and provide current. These faults can lead to electrical open circuits, where no power is provided to the circuit, and/or battery internal electrical short circuits, where a path of low electrical resistance within the battery is created. A short circuit can lead to an unexpectedly large amount of power being provided to a component of an electrical circuit, including but not limited to, a battery in the electrical circuit.

SUMMARY

In an example embodiment, a battery is described. The battery includes one or more cells. Each cell includes a plurality of battery cell segments. Each battery cell segment includes: an anode segment, a cathode segment, and one or more current limiters configured to conditionally electrically isolate the battery cell segment based on an occurrence of a short circuit within the battery cell segment.

In another example embodiment, a method is described. Electrical power is stored using a battery, where the battery includes one or more cells, where each cell includes a plurality of battery cell segments, and where each battery cell segment includes: an anode segment, a cathode segment, and one or more current limiters. A particular battery cell segment is conditionally electrically isolated based on an occurrence of a short circuit within the battery cell segment.

In a further example embodiment, a method is described. Electrical power is provided to a load using a battery, where the battery includes one or more cells, where each cell includes a plurality of battery cell segments, and where each battery cell segment includes: an anode segment, a cathode segment, and one or more current limiters. A particular battery cell segment is conditionally electrically isolated based on an occurrence of a short circuit within the battery cell segment.

In yet another example embodiment, a battery is described. The battery includes one or more cells. Each cell includes a plurality of battery cell segments. Each battery cell segment includes: a positive temperature coefficient (PTC) material whose resistance increases with temperature, an anode segment, a cathode segment, and one or more current limiters configured to conditionally electrically isolate the battery cell segment based on an occurrence of a short circuit within the battery cell segment.

In still another example embodiment, a method is described. Electrical power is stored using a battery, where the battery includes one or more cells, where each cell includes a plurality of battery cell segments, and where each battery cell segment includes: a positive temperature coefficient material whose resistance increases with temperature, an anode segment, a cathode segment, and one or more current limiters. A particular battery cell segment is conditionally electrically isolated based on an occurrence of a short circuit within the particular battery cell segment.

In even another example embodiment, a method is described. Electrical power is provided to a load using a battery, where the battery includes one or more cells, where each cell includes a plurality of battery cell segments, and where each battery cell segment includes: a positive temperature coefficient material whose resistance increases with temperature, an anode segment, a cathode segment, and one or more current limiters. A particular battery cell segment is conditionally electrically isolated based on an occurrence of a short circuit within the particular battery cell segment.

It should be understood that the description provided in this summary section and elsewhere in this document is intended to illustrate aspects of the present disclosure by way of non-limiting example. Generally, the features, functions, components, and advantages that are discussed herein can be achieved independently in various embodiments or may be combined in yet other embodiments, further details of which are disclosed in the following description and the accompanying drawings.

BRIEF DESCRIPTION OF THE FIGURES

FIG. 14 is a flowchart of a method for storing electrical power using a battery, according to an example embodiment.

FIG. 15 is a flowchart of a method for providing electrical power using a battery, according to an example embodiment.

FIG. 19 is a flowchart of a method for storing electrical power using a battery, according to an example embodiment.

FIG. 20 is a flowchart of a method for providing electrical power using a battery, according to an example embodiment.

DETAILED DESCRIPTION

Figure 1:
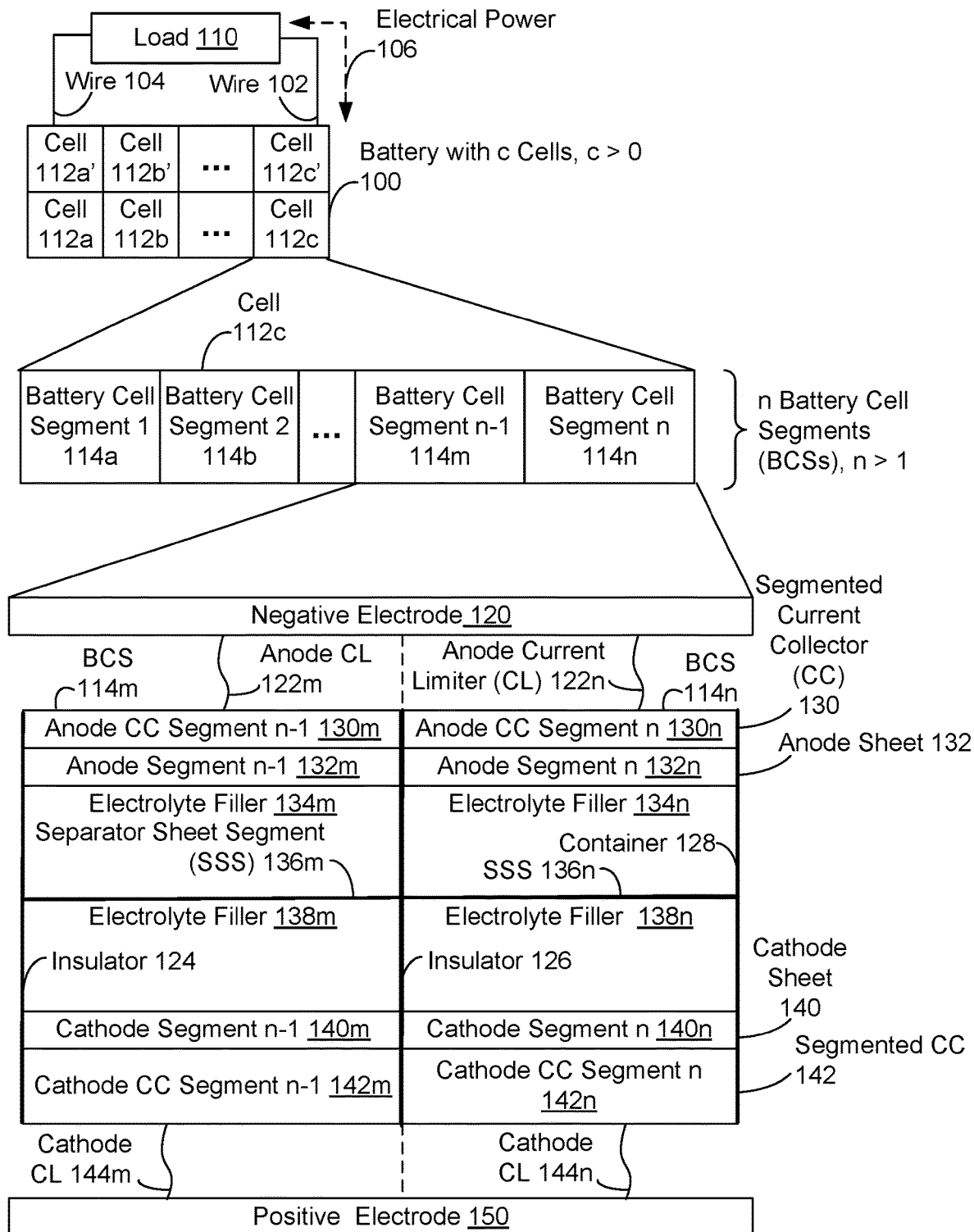
FIG. 1 is a block diagram of a battery and an electrical load, according to an example embodiment.

An internal short circuit may occur in a lithium ion battery cell. Such internal short circuits are difficult, if not impossible, to sense and managed externally and can cause damage to the entire battery. In some cases, internal short circuits can lead to battery fires, and the attendant risk to an environment proximate to the battery. In some examples, battery chemistry can be changed to reduce electrical activity of the battery and so reduce the risk of an internal short. The drawback of this approach is that it reduces the battery energy density, making batteries relatively larger.

To reduce these risks, a battery with one or more cells, each cell including a plurality of battery cell segments is described. Each battery cell segment is electrically isolated, and so the use of these battery cell segments provides a battery that can prevent and isolate a potential internal short circuit, thus keeping the battery safe and operational. Each battery cell segment is internal to the battery and/or a cell of the battery, and so no internal sensing is required. Rather, each battery cell segment has one or more current limiters that can detect a short circuit within the battery cell segment and consequently break an electrical circuit. Thus, a battery using battery circuits with current limiters enables automatic detection, location, and isolation of (potential) short circuits within the battery cell segment, keeping the remaining segments of the battery safe and operational.

More particularly, a battery cell segment of a battery can have an anode segment, a cathode segment, and one or more current limiters configured to conditionally electrically isolate the battery cell segment based on an occurrence of a short circuit within the battery cell segment. A current limiter of the one or more current limiters can be, or include, one or more electrical components that restrict current flow to a maximum amount. The current limiters can include a current limiter electrically connected to the anode segment and/or a current limiter electrically connected to the cathode segment.

A battery cell segment can include one or more insulators that electrically isolate the battery cell segment from one or more other battery cell segments and/or one or more current collectors. For example, an insulator of a battery cell segment can be shaped as an insulator strip whose thickness is based on the thickness of other layers of the battery; e.g., as thick as the total thickness of anode, cathode, separator, and electrolyte layers. A current collector can receive electrons from either the battery or from a circuit connected to the battery. For example, a battery cell segment can have an anode current collector electrically connected to the anode segment; and/or a cathode current collector electrically connected to the cathode segment.

Current collectors of a battery cell segment can be electrically connected to battery electrodes. For example, the anode current collector can also be electrically connected to a negative electrode for the battery, and/or the cathode current collector can also be electrically connected to a positive electrode for the battery. The battery electrodes can electrically connect multiple segments and/or cells of the battery.

A current limiter of a battery cell segment can electrically connect a current collector of a segment and a battery electrode; then, the current limiter can restrict an amount of current being provided from the battery cell segment (via the current collector) to the electrode or vice versa. In particular, a battery cell segment can have an anode current collector electrically connected to the anode sheet and an anode current limiter electrically connecting the anode current collector to a negative battery electrode and/or a cathode current collector electrically connected to the cathode sheet and a cathode current limiter electrically connecting the cathode current collector to a positive battery electrode Examples of segmented batteries include, but are not limited to, lithium ion batteries. Lithium ion batteries can have lithium in one or more anodes for releasing electrons; i.e., anode sheets and/or anode segments. The electrons released by the anode(s) can be received at cathode(s); i.e., cathode sheets and/or cathode segments, of these lithium ion batteries. In some cases, an electrolyte can be used as filler and aid transfer of ions between electrodes of the battery.

Battery cell segments can be used with a wide variety of battery chemistries, including but not limited to lithium-ion based battery chemistries. Examples of other battery chemistries, such as other high energy density batteries, can use other materials for anodes and/or cathodes than used in lithium ion batteries. Batteries using these other battery chemistries can be segmented using the same or similar techniques disclosed herein for segmenting batteries. Batteries of virtually any size can utilize battery cell segments, from relatively-small batteries, such as used in personal electronics and other applications, to relatively-large batteries used in vehicles, including aircraft, sea craft, and land vehicle and other applications. Thus, the use of segmented batteries can improve battery safety for a wide range of batteries and battery applications.

FIG. 1 is a block diagram of battery 100 and electrical load 110, according to an example embodiment. A top portion of FIG. 1 illustrates that battery 100 and electrical load 110 are connected via wires 102 and 104. Battery 100 can store electrical power and provide some or all of the stored power to electrical load 110 as electrical power 106 while battery 100 is operating in a discharge mode, as indicated by an arrow of electrical power 106 going from battery 100 to electrical load 110. In some examples, electrical load 110 can be replaced by and/or include a power source providing power to battery 100 operating in a charge mode, as indicated by an arrow of electrical power 106 going from electrical load 110 to battery 100.

Battery 100 can include c cells, c>0, that include cells 112$a'$, 112$a$, 112$b'$, 112$b$ . . . 112$c'$, 112$c$ which can be connected in series and/or parallel. At least one of cells 112$a'$, 112$a$, 112$b'$, 112$b$ . . . 112$c'$, 112$c$, can include two or more battery cell segments (BCSs). For example, a upper-central portion of FIG. 1 shows cell 112$c$ is made up of n battery cell segments, n>1, which include battery cell segments 114$a$, 114$b$ . . . 114$m$, 114$n$. As such, battery 100 can include a plurality of battery cell segments; e.g., battery cell segments 114$a$, 114$b$, . . . 114$m$, 114$n$ of cell 112$c$ and battery cell segments in cells 112$a'$, 112$a$, 112$b'$, 112$b$, . . . (not shown in FIG. 1).

Battery cell segments 114$a$, 114$b$ . . . 114$m$, 114$n$ can be connected in parallel within cell 112$c$. In particular, battery cell segments and/or cells of battery 100 can be electrically connected in parallel to electrodes, such as negative electrode 120 and positive electrode 150. Electrodes 120 and 150 can conduct electrical current, and thereby conduct electrical power, from electrical load 110 to battery 100 operating in the charge mode or conduct electrical current/electrical power to electrical load 110 from battery 100 operating in the discharge mode. Power can be provided to and/or drawn from battery 100 as part of a circuit that electrically connects negative electrode 120 and positive electrode 150; e.g., a circuit including battery 100, wire 102 connecting battery 100 with electrical load 110, and wire 104 also connecting battery 100 with electrical load 110.

A lower portion of FIG. 1 shows a top view of neighboring battery cell segments 114$m$ and 114$n$. Battery cell segments 114$m$ and 114$n$ of cell 112$c$ are both electrically connected to negative electrode 120 and positive electrode 150. Insulator 126 separates battery cell segments 114$m$ and 114$n$, which, include respective anode current limiters (CLs) 122$m$, 122$n$, anode current collector (CC) segments 130$m$, 130$n$, anode segments 132$m$, 132$n$, electrolyte fillers 134$m$, 134$n$, separator sheet segments (SSSs) 136$m$, 136$n$, electrolyte fillers 138$m$, 138$n$, cathode segments 140$m$, 140$n$, cathode current collector segments 142$m$, 142$n$, and cathode current limiters 144$m$, 144$n$. In some examples, a battery cell segment can have only one current limiter. For example, battery cell segment 114$m$ can include only anode current limiter 122$m$ (or only cathode current limiter 144$m$) rather than both current limiters 122$m$ and 144$m$.

Negative electrode 120 is electrically connected to respective battery cell segments 114$m$, 114$n$ via respective anode current limiters 122$m$, 122$n$, which are also electrically connected to respective anode current collector segments 130$m$, 130$n$. Current limiters, such as current limiters 122$m$, 122$n$, 144$m$, and 144$n$, can include one or more electrical components that restrict current flow to a maximum amount. Example current limiters include, but are not limited to, a fuse, a positive temperature-efficient (PTC) current limiter, and a circuit breaker. A fuse can cause a battery cell segment to be completely electrically isolated if current passing through the fuse exceeds the fuse's current limit. A PTC current limiter can have an electrical resistance that increases as temperature of the PTC current limiter increases. As the electrical resistance of the PTC current limiter increases with temperature, the PTC current limiter can restrict current to a designated value, and so protect the battery cell segment. Also, the electrical resistance of the PTC current limiter can decrease as the temperature of the PTC current limiter decreases, so the PTC current limiter can continue functioning as a current limiting device. A circuit breaker can include an electrical switch, which can be opened to electrically isolate a battery cell segment if current passing through the current passing through the circuit breaker exceeds the circuit breaker's current limit.

A current limiter can conditionally isolate a battery cell segment when a fault condition, such as an internal short circuit, occurs that involves the battery cell segment. For example, if an internal short circuit occurs within battery cell segment 114$m$, then a relatively-large amount of current can flow through battery cell segment 114$m$. In this condition where an internal short circuit occurs, anode current limiter 122$m$ and/or cathode current limiter 144$m$ can conditionally electrically isolate battery cell segment 114$m$. Other examples of conditionally isolating battery cell segments using current limiters are possible as well.

Current collector segments 130$m$, 130$n$, 142$m$, 142$n$ can receive electrons from battery 100 and provide the electrons to a circuit connecting battery 100 to electrical load 110, or vice versa. In some examples, some or all of current collector segments 130$m$, 130$n$, 142$m$, 142$n$ can be electrically insulated from adjacent current collectors of other segments.

Anode current collector segments 130$m$, 130$n$, which are part of segmented current collector 130 and of respective battery cell segments 114$m$, 114$n$, are electrically connected to respective anode segments 132$m$, 132$n$. Respective anode segments 132$m$, 132$n$ are separated by respective electrolytic filler 134$m$, 134$n$, separator sheet segments 136$m$, 136$n$, and electrolytic filler 138$m$, 138$n$, from respective cathode segments 140$m$, 140$n$. Electrolyte fillers 134$m$, 134$n$, 138$m$, 138$n$ can aid transfer of ions between electrodes of the battery. Respective cathode segments 140$m$, 140$n$ can be electrically connected to respective cathode current collector segments 142$m$, 142$n$. Cathode current collector segments 142$m$, 142$n$ are electrically connected to respective cathode current limiters 144$m$, 144$n$, which also electrically connect respective battery cell segments 114$m$, 114$n$ to positive electrode 150.

An insulator of battery 100 can chemically insulate and/or electrically insulate, or resist current flow, between components of battery 100. As examples, insulators 124 and 126 electrically insulate battery cell segment 114$m$ from adjacent battery cell segments; e.g., insulator 126 electrically insulates battery cell segment 114$m$ from battery cell segment 114$n$. Other components of battery 100 can act as insulators; e.g., container 128 can electrically insulate and otherwise protect battery cell segment 114$n$ from an environment outside battery 100.

Separator sheet segments 136$m$, 136$n$ can be made of one or more separator materials and provide some protection from a circuit being formed between an anode segment and a cathode segment of a battery cell segment while allowing ion flow within battery 100. However, if either of separator sheet segments 136$m$, 136$n$ fails to prevent formation of a short circuit between a respective anode segment 132$m$, 132$n$ and respective cathode segment 140$m$, 140$n$, respective anode current limiters 122m, 122n and/or respective cathode current limiters 144m, 144n of respective battery cell segments 114m, 114n can limit the amount of current provided by a now-short-circuited battery cell segment.

In some examples, battery 100 can be a lithium ion battery. In these lithium-ion examples, anodes, such as anode segments 132m, 132n, can be made of one or more anode materials such as an intercalated lithium compound including, but not limited to, lithium cobalt oxide, lithium iron phosphate, lithium manganese oxide, and lithium nickel manganese cobalt oxide, lithium phosphate, lithium ferrite, a lithium polymer, and perhaps other materials; e.g., carbonaceous materials including graphite, copper foil, tin, misch metal alloys. Other lithium batteries can use metallic lithium as an anode material. In these lithium-ion examples, cathodes, such as cathode segments 140m, 140n can be made of one or more cathode materials including, but not limited to, manganese dioxide, carbon monofluoride, iron disulfide, thionyl chloride, bromine chloride, sulfur dioxide, sulfuryl chloride, and carbon. Also, in these lithium-ion examples, example materials used as electrolyte fillers include, but are not limited to, one or more of lithium perchlorate, propylene carbonate, dimethoxyethane, lithium tetrafluoroborate, gamma butroactone, dioxolane, dimethoxyethane, lithium tetracholoraluminate, thionyl chloride, lithium bromide, sulfur dioxide, and acetonitrile. In other examples, different anode, electrolyte, and/or cathode materials can be used in lithium ion batteries.

Insulators of battery 100, such as insulators 124, 126, can be made up of one or more electrically insulating materials, including but not limited to, polyvinyl chloride, polyethylene terephthalate, polypropylene, tetrafluoroethylene, polyolefin, ceramics, cotton, nylon, polyester, glass, wood, and wood products, such as cardboard or paper. Other insulator sheets and/or materials are possible as well. Separators of battery 100, such as separator sheet segments 136m, 136n, can be made of separator materials, where separator materials can be, for example, one or more materials with a microporous polymer membrane.

In designing battery 100, a minimum number of battery cell segments per cell can be determined. Consider that the maximum allowed current of a segment is $I_{max}$ for a duration of time τ, beyond which the segment may be subject to an accelerated thermal degradation or damage, where values of $I_{max}$ and τ for a specific battery can be determined experimentally according to the specific battery's chemistry. Then, if a cell capacity is C, a minimum number n of battery cell segments of a cell can be determined using the following equation:

$$n = \frac{c}{I_{max}\tau}.$$

$I_{max}$ and/or τ can also be used in selecting a current limiter for each segment.

Figure 2:
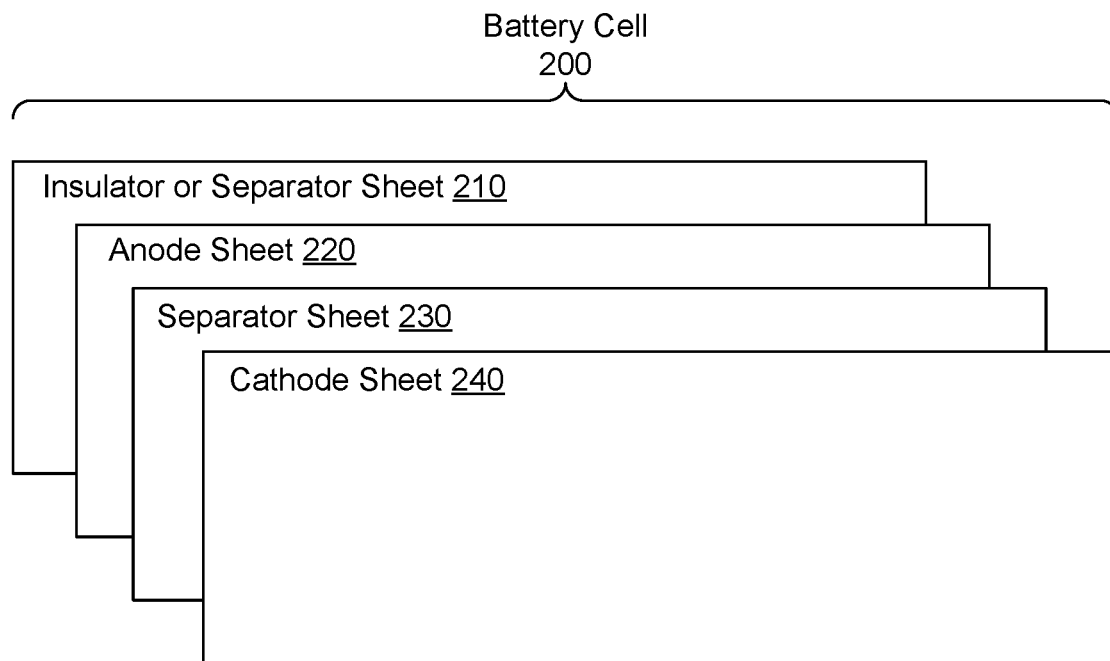
FIG. 2 is a block diagram of a conventional battery cell.

FIG. 2 is a block diagram of conventional battery cell 200. Battery cell 200 includes stacked sheets 210, 220, 230, and 240, which can be wrapped into cylinders to make cylindrical cells or folded into rectangular blocks to make prismatic cells. Battery cell 200 can include insulator or separator sheet 210 which can be made of one or more electrically insulating materials, anode sheet 220 which can be made of one or more anode materials, separator sheet 230 which can be made of one or more separator materials, and cathode sheet 240 which can be made of one or more cathode materials. Example electrically insulating materials, anode materials, separator materials, and cathode materials are listed above in the context of FIG. 1. In battery cell 200, insulator or separator sheet 210 can protect battery cell 200 from an environment outside the battery, anode sheet 220 can act as an anode, cathode sheet 240 can act as a cathode, and separator sheet 230 can provide some protection from a circuit being formed between anode sheet 220 and cathode sheet 240 while allowing ion flow within battery cell 200.

In batteries 100 and 200, insulators and separators differ, as insulators do not permit lithium ion flow, while separators do permit lithium ion flow. Taking as an example battery 200, if insulator or separator sheet 210 was not present in battery 200, and if sheets 220, 230, and 240 were wrapped from left to right, anode sheet 220 could touch cathode sheet 240, and then battery 200 would not operate. If insulator or separator sheet 210 is present as a separator sheet, and if sheets 210, 220, 230, and 240 were wrapped from left to right to form battery 200, the cathode and anode layers will have separators on its inner and outer sides, leading to a workable battery having a double-sided reaction. If insulator or separator sheet 210 is present as an insulator sheet, and if sheets 210, 220, 230, and 240 were wrapped from left to right to form battery 200, then each of anode sheet 220 and cathode sheet 240 has a separator layer on one side and an insulator layer on the other side, avoiding double-sided reactions.

Figure 3:
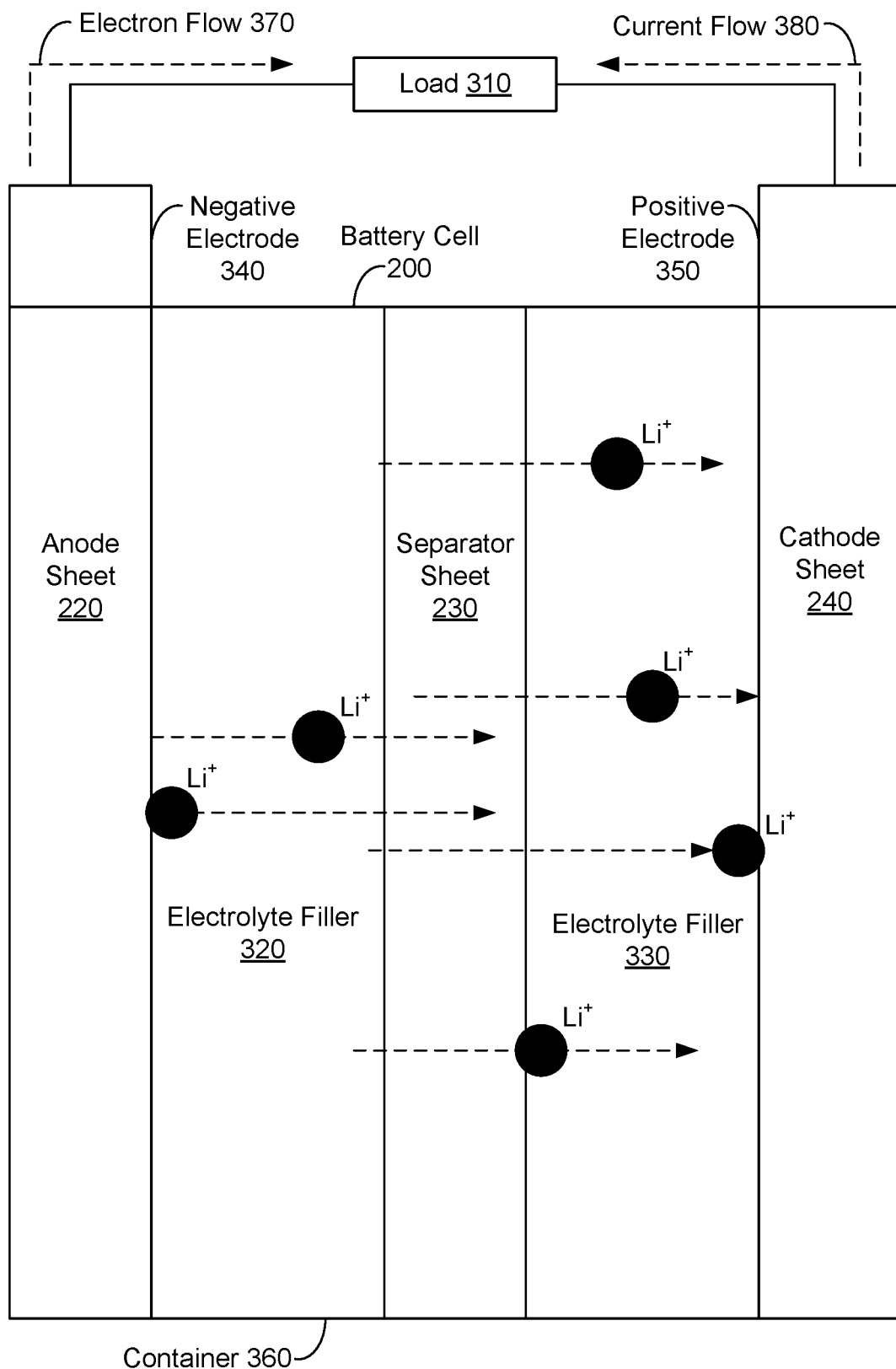
FIG. 3 is a diagram of the battery cell of FIG. 2 providing current to an electrical load.

FIG. 3 is a diagram of battery cell 200 providing current flow 380 to an electrical load 110. As battery cell 200 is providing current (as current flow 380) to electrical load 310, battery cell 200 can be considered to be in a discharge mode. While in the discharge mode, lithium ions (Li+) shown as black circles in FIG. 3, flow from anode sheet 220 through electrolyte filler 320, separator sheet 230, and electrolyte filler 330 to cathode sheet 240; that is, from left to right as shown in FIG. 3.

Battery cell 200 can include two electrodes; a negative electrode 340 which can be a source of electron flow 370 from battery cell 200 toward electrical load 310 while battery cell 200 is in the discharge mode, and a positive electrode 350 which can be a source of current flow 380 from battery cell 200 toward electrical load 310 while battery cell 200 is in the discharge mode. Battery cell 200 can also include container 360 to provide protection from an environment outside the battery.

Battery cell 200 can be in a discharge mode, as mentioned above, or in a charge mode. When battery cell 200 is in the charge mode, lithium ions of battery cell 200 move in an opposite direction from cathode sheet 240 to anode sheet 220 than shown in FIG. 3; that is, the lithium ions from right to left in FIG. 3. When battery cell 200 is in the charge mode, current flow 380 reverses its flow direction in comparison to when battery cell 200 is in the discharge mode.

Figure 4:
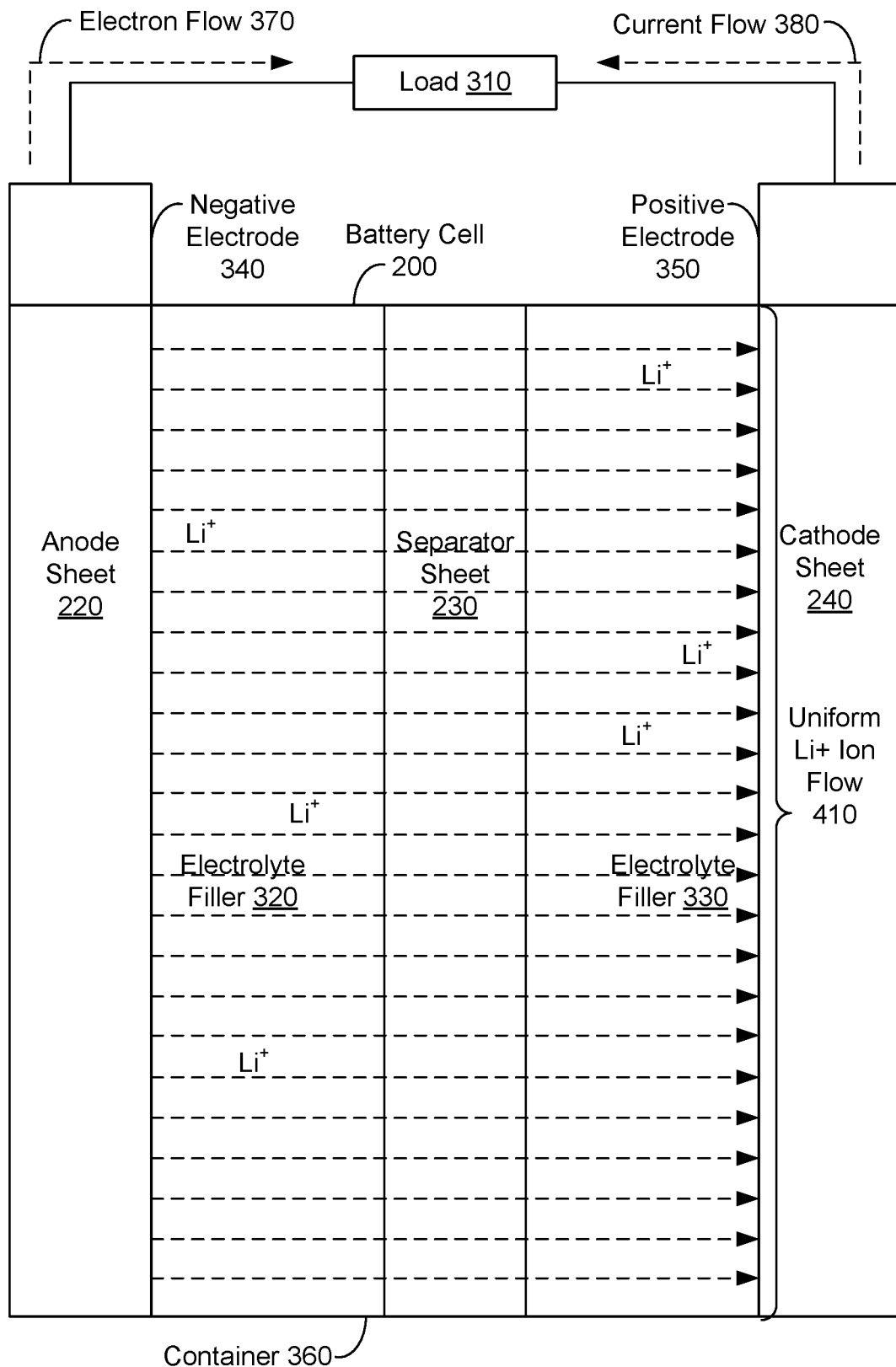
FIG. 4 is a diagram of the battery cell of FIG. 2 providing current to the electrical load based on a uniform ion flow.

FIG. 4 is a diagram of battery cell 200 providing current flow 380 to electrical load 310 based on a uniform lithium ion flow 410. In a normal condition of battery cell 200 operating in the discharge mode, a uniform lithium ion flow 410 travels from left to right in FIG. 4 from anode sheet 220, across electrolyte filler 320, separator sheet 230, and electrolyte filler 330 to arrive at cathode sheet 240. In a normal condition of battery cell 200 operating in the charge mode, uniform lithium ion flow 410 is reversed; that is uniform lithium ion flow 410 travels from right to left in FIG. 4.

Figure 5:
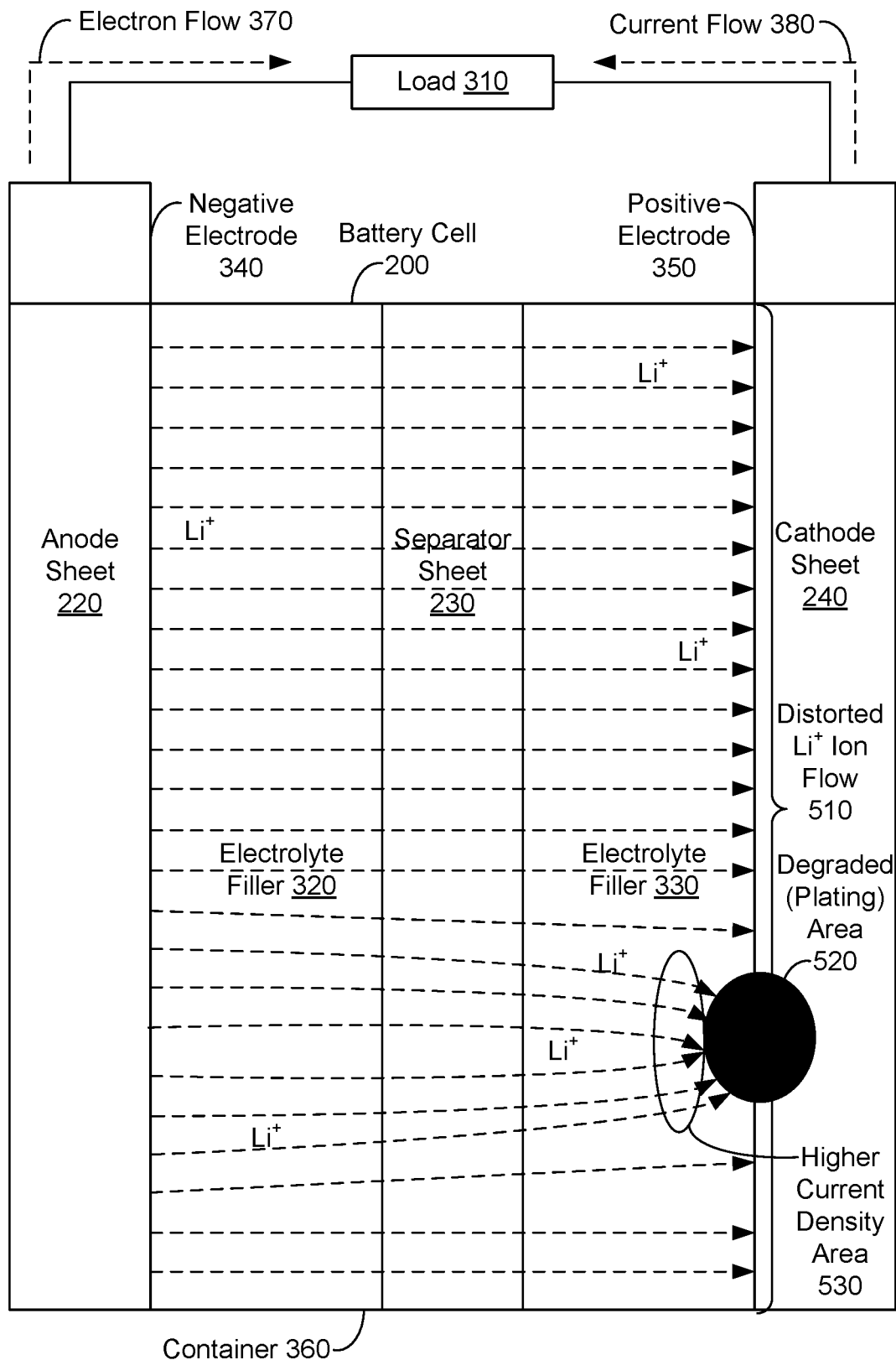
FIG. 5 is a diagram of the battery cell of FIG. 2 providing current to the electrical load based on a degraded ion flow.

FIG. 5 is a diagram of battery cell 200 providing current flow 380 to electrical load 310 based on distorted lithium ion flow 510. When battery cell 200 is operating in a discharge mode, faults can occur that distort a uniform lithium ion flow. One such fault is a degradation mechanism involving lithium plating in degraded area 520. If lithium plating does occur in degraded area 520 of battery cell 200 as shown in FIG. 5, the lithium plating can result in distorted lithium ion flow 510 from anode sheet 220 to cathode sheet 240 via separator sheet 230 and electrolyte fillers 320, 330. Distorted lithium ion flow 510 can cause local maxima of current density, such as higher current density area 530 at the intersection of distorted lithium ion flow 510 and degraded area 520.

Figure 6:
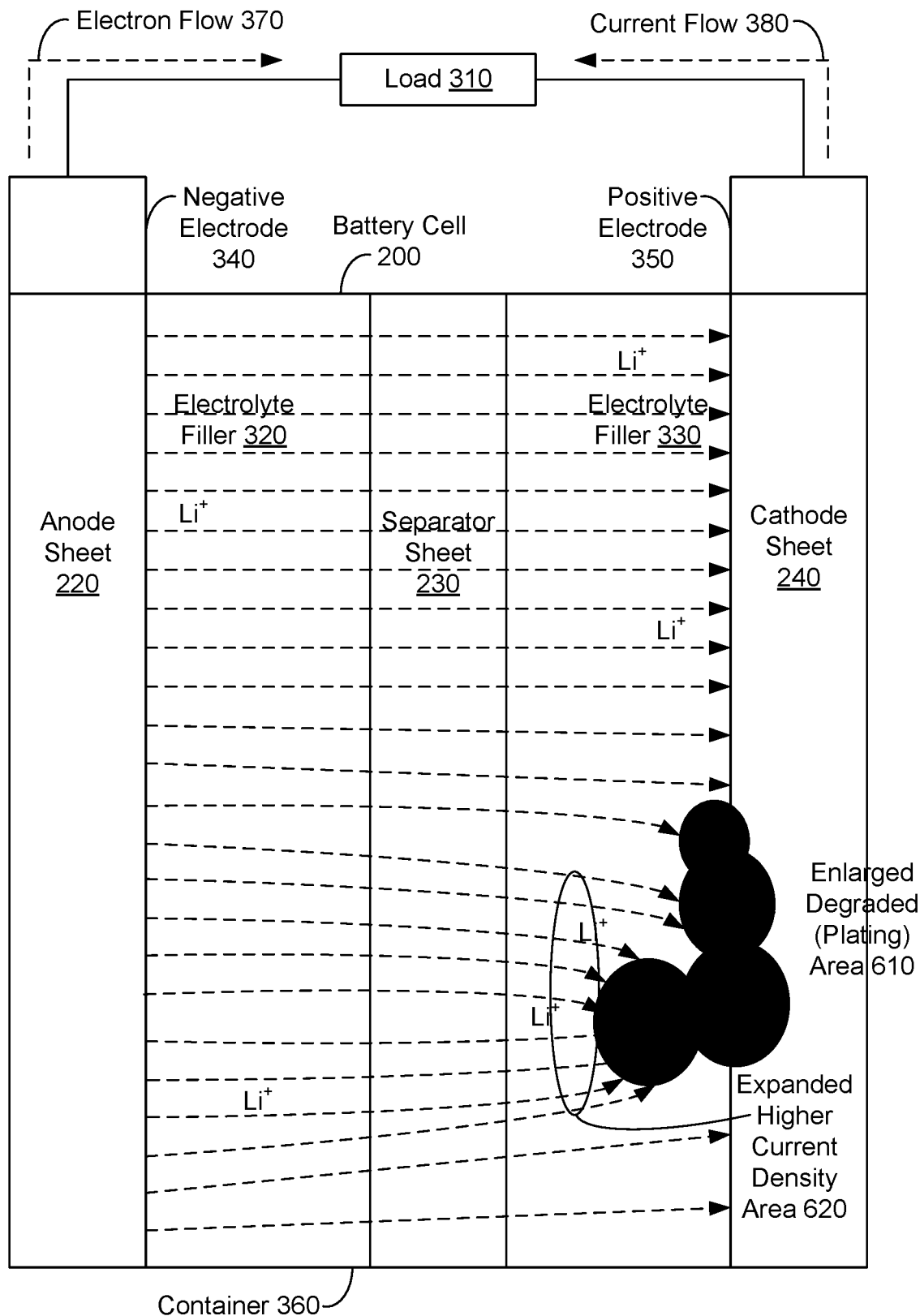
FIG. 6 is a diagram of the battery cell of FIG. 2 having an enlarged degraded area.

FIG. 6 is a diagram of battery cell 200 having an enlarged degraded area 610. If the lithium plating mentioned in the context of FIG. 4 increases, an enlarged degraded area can occur in battery cell 200. For example, if battery cell 200 endures prolonged exposure to relatively-high heat, a result in distorted flow of lithium ions across electrodes 340, 350, separator sheet 230, and electrolyte fillers 320, 330 can expand. Then, degraded area 520 of FIG. 5 can grow to become enlarged degraded area 610 of FIG. 6. As enlarged degraded area 610 expands, higher current density area 530 of FIG. 5 can expand to become expanded higher current density area 620 as well.

Figure 7:
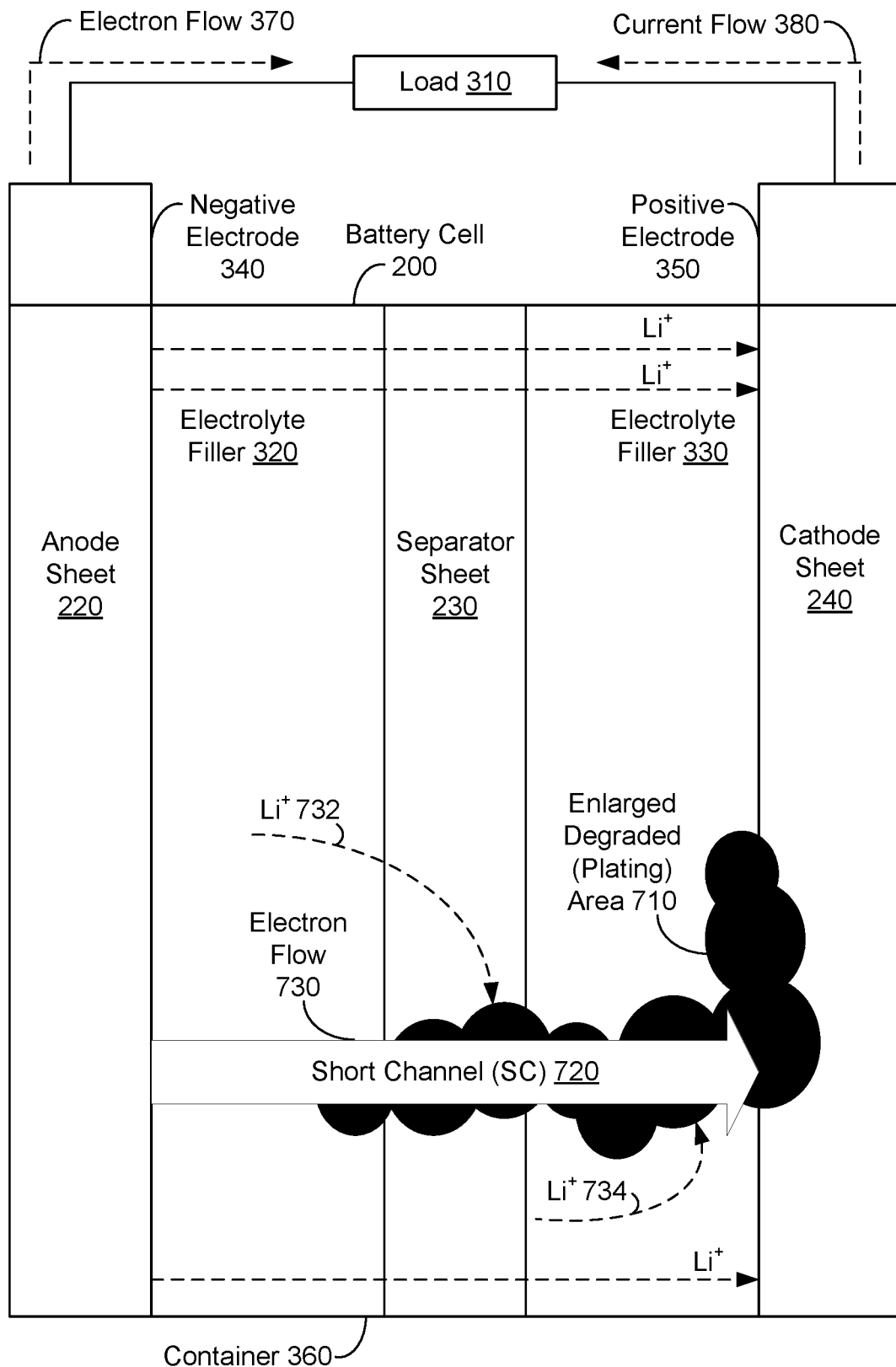
FIG. 7 is a diagram of the battery cell of FIG. 2 having a short channel in an enlarged degraded area.

FIG. 7 is a diagram of battery cell 200 having short channel (SC) 720 in enlarged degraded area 710. If enlarged degraded area 610 continues to grow; i.e., battery cell 200 continues to be exposed to relatively-high heat, to become enlarged degraded area 710, then enlarged degraded area 710 can eventually bridge anode sheet 220 and cathode sheet 240, resulting in short channel 720 through enlarged degraded area 710.

Short channel 720 can form a closed current loop with electron flow 730 within battery cell 200. Once short channel 720 forms and electron flow 730 begins, relatively-few electrons can flow as electron flow 370 to electrical load 310. Also, some electrons in electron flow 730 within short channel 720 can be neutralized by lithium ions 732, 734 attracted from electrolyte fillers 320, 330 to enlarged degraded area 710. The actual number of electrons in electron flow 730 to electrical load 310 can depend on the electrical resistance of short channel 720 and the electrical resistance of electrical load 310. Thus, an internal short circuit, such as short channel 720, can be difficult to detect using a sensing circuit that is external to (i.e., outside of) battery cell 200.

Figure 8:
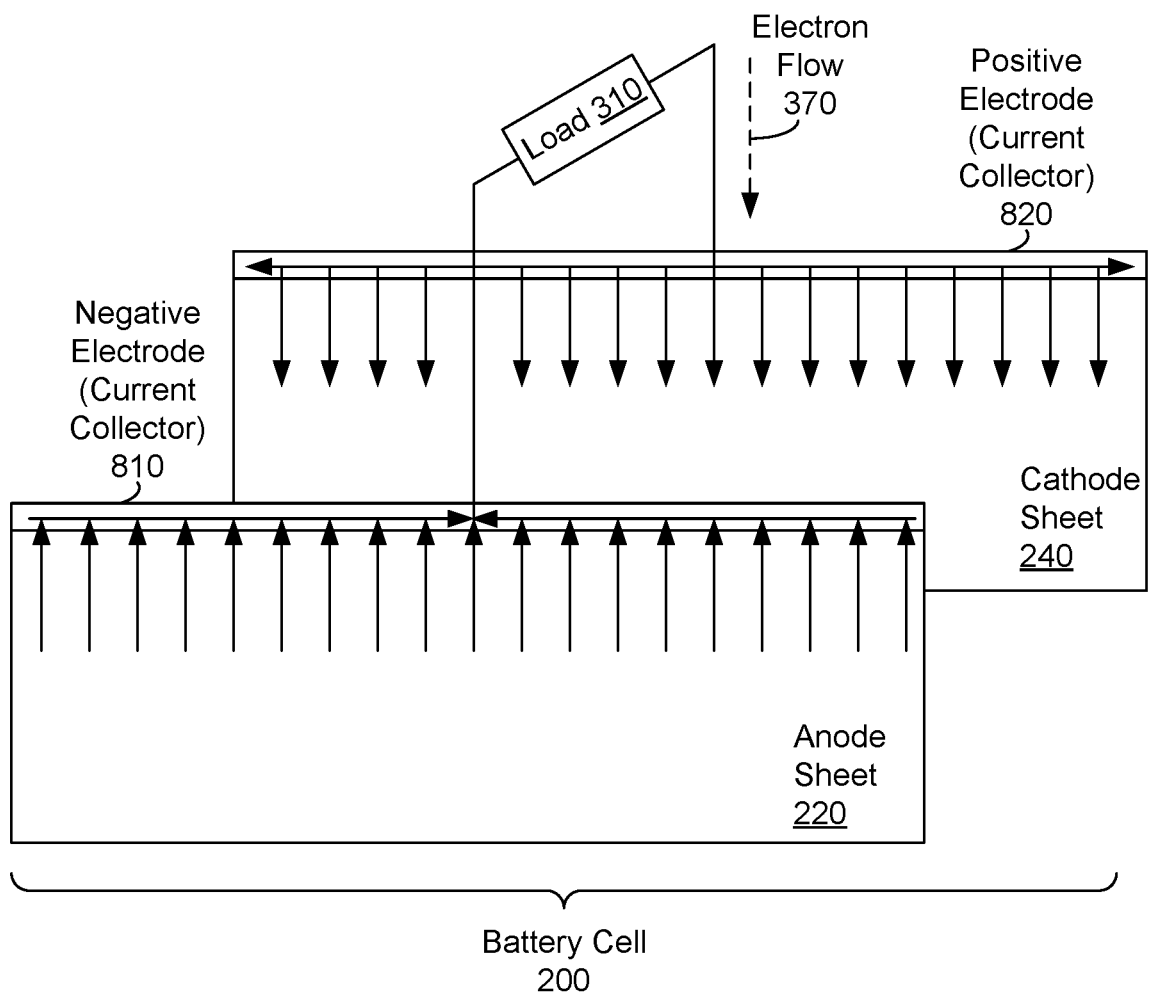
FIG. 8 is a diagram of anode and cathode sheets of the battery cell of FIG. 2 providing an electron flow to the electrical load while operating in a normal discharge mode.

FIG. 8 is a diagram of anode sheet 220 and cathode sheet 240 of battery cell 200 providing electron flow 370 to electrical load 310 while battery cell 200 is operating in a normal discharge mode. In the normal discharge mode, electrons can be collected at negative electrode 810, which can act as a current collector, from anode sheet 220 of battery cell 200. The electrons can flow as electron flow 730 through electrical load 310 to positive electrode 820, which can act as a current collector. Electrons arriving at positive electrode 820 can be uniformly distributed across cathode sheet 240. In the discharge mode, lithium ion flow (not shown in FIG. 8) can start at anode sheet 220, continue across a separator sheet, such as separator sheet 230, and arrive at cathode sheet 240.

Figure 9:
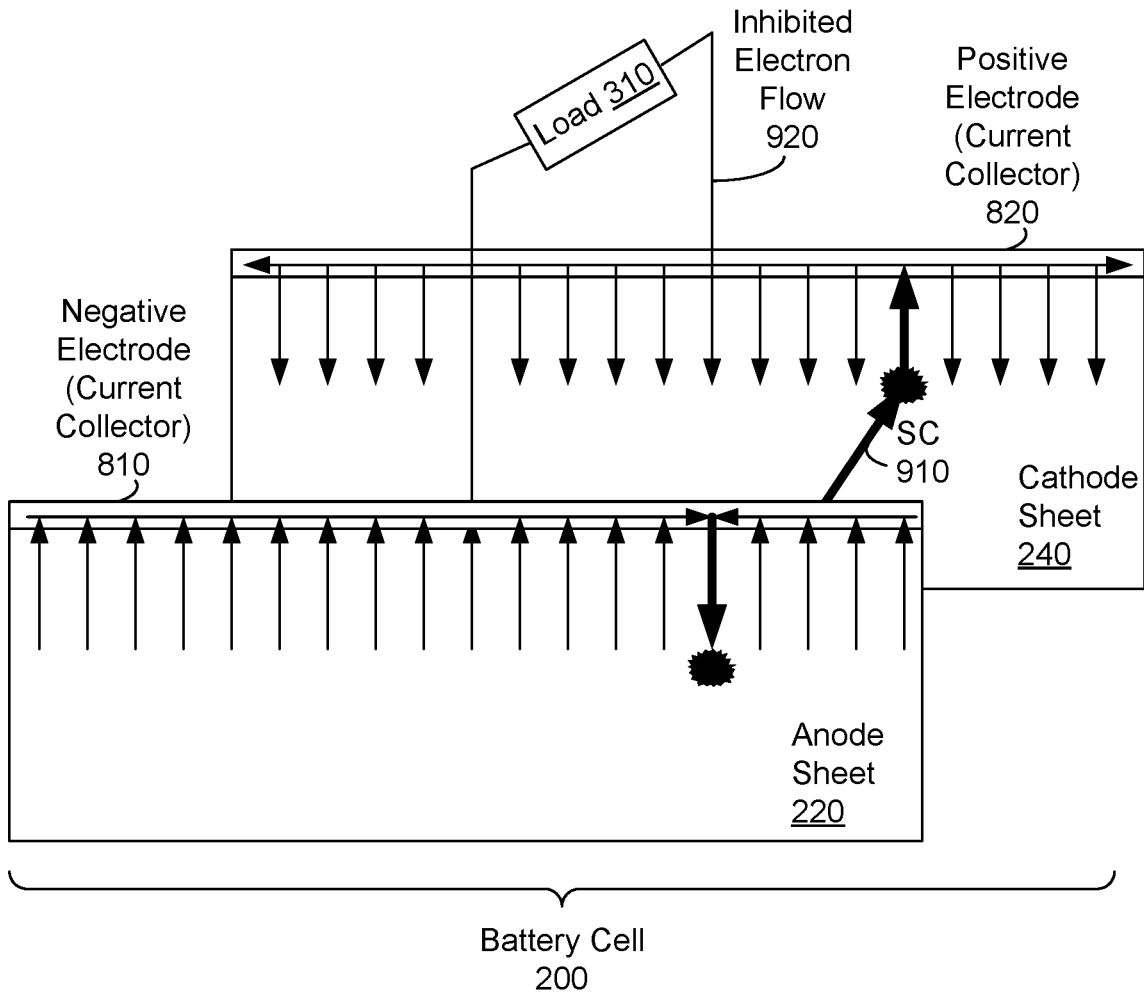
FIG. 9 is a diagram of the anode and cathode sheets of the battery cell of FIG. 2 having a short channel.

FIG. 9 is diagram of anode sheet 220 and cathode sheet 240 of battery cell 200, when battery cell 200 has short channel 910. In a discharge mode with an internal short circuit such as short channel 910, electrons can be collected at negative electrode 810 from anode sheet 220 of battery cell 200, just as when battery cell 200 is in a normal discharge mode. However, when battery cell 200 has an internal short circuit, electrons can flow via short channel 910 to cathode sheet 240 instead of flowing to electrical load 310, leading to inhibited electron flow 920 through electrical load 310. The electrons arriving at cathode sheet 240 can be collected at positive electrode 820 and distributed throughout cathode sheet 240, as indicated by the arrows from short channel 910 to cathode sheet 240 and through positive electrode 820. Typically, electrical resistance through short channel 910 is much less than an electrical resistance through electrical load 310, and so most, if not all, electrons flow through short channel 910 rather than flow through electrical load 310, leading to inhibited electron flow 920.

Figure 10:
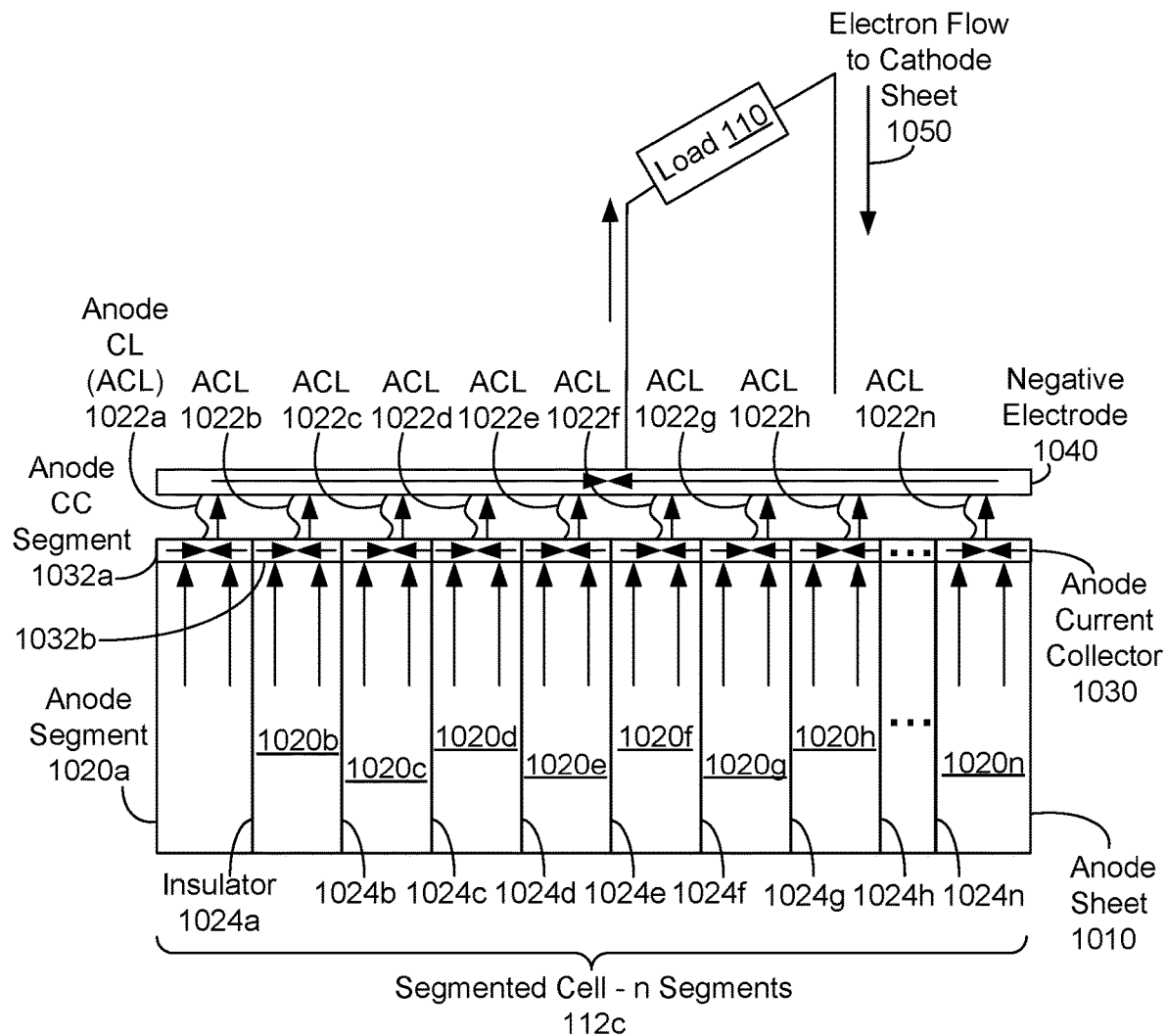
FIG. 10 is a diagram of a segmented anode sheet and a negative electrode of a battery cell of the battery of FIG. 1, according to an example embodiment.

FIG. 10 is a diagram of segmented anode sheet 1010 and negative electrode 1040 of battery cell 112c of battery 100, according to an example embodiment. As indicated in FIGS. 1 and 10-13, battery cell 112c is a segmented battery cell having n battery cell segments, n>1. In FIG. 10, the segments of anode sheet 1010 are shown as anode segments 1020a, 1020b, 1020c, 1020d, 1020e, 1020f, 1020g, 1020h . . . 1020n. The anode segments are electrically insulated from each other by insulators 1024a, 1024b, 1024c, 1024d, 1024e, 1024f, 1024g, 1024h . . . 1024n. For example, anode segment 1020b is electrically insulated from anode segment 1020a by insulator 1024a and is electrically insulated from anode segment 1020c by insulator 1024b.

Anode segments 1020a, 1020b, 1020c, 1020d, 1020e, 1020f, 1020g, 1020h . . . 1020n are connected to anode current collector 1030, which is segmented so that each segment of anode current collector 1030 is connected to a corresponding segment of anode sheet 1010. Further, each segment of anode current collector 1030 is both electrically isolated from other anode current collector segments and connected to negative electrode 1040 via an anode current limiter (ACL). For example, FIG. 10 shows that: anode segment 1020a of anode sheet 1010 is connected to anode current collector segment 1032a of anode current collector 1030, anode current collector segment 1032a is also connected to anode current limiter 1022a, and anode current limiter 1022a is also connected to negative electrode 1040. FIG. 10 also shows that each segment of anode current collector 1030 is electrically insulated from other anode current collector segments by insulators 1024a, 1024b, 1024c, 1024d, 1024e, 1024f, 1024g, 1024h . . . 1024n; e.g., anode current collector segment 1032a is separated by insulator 1024a from adjacent anode current collector segment 1032b.

When battery 100 is in a normal discharge mode, electrons are collected at segmented anode current collector 1030 from anode segments 1020a, 1020b, 1020c, 1020d, 1020e, 1020f, 1020g, 1020h . . . 1020n of anode sheet 1010. The collected electrons flow from segmented anode current collector 1030 through anode current limiters 1022a, 1022b, 1022c, 1022d, 1022e, 1022f, 1022g, 1022h, . . . 1022n to negative electrode 1040. These electron flows are illustrated in FIG. 10 by arrows from anode sheet 1010 to anode current collector 1030, arrows from anode current collector 1030 through anode current limiters 1022a . . . 1022n to negative electrode 1040. The electrons then flow from negative electrode 1040 to electrical load 110 and then as electron flow 1050 to a cathode sheet, which is shown in FIG. 11.

Figure 11:
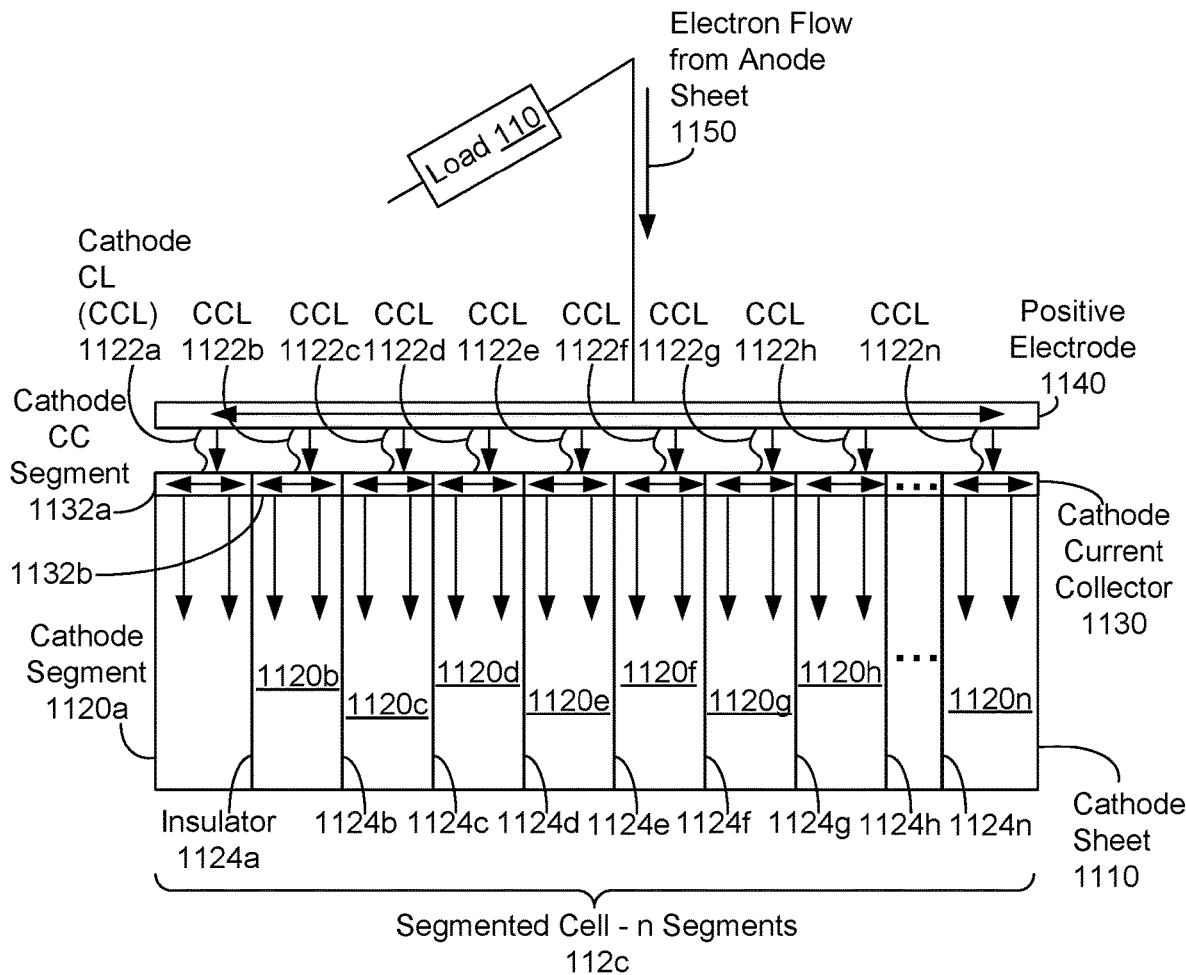
FIG. 11 is a diagram of a segmented cathode sheet and a positive electrode of the battery cell of FIG. 10, according to an example embodiment.

FIG. 11 is a diagram of segmented cathode sheet 1110 and positive electrode 1140 of battery cell 112c, according to an example embodiment. As indicated in FIGS. 1 and 10-13, battery cell 112c has n battery cell segments, n>1. In FIG. 11, the segments of cathode sheet 1110 are shown as cathode segments 1120a, 1120b, 1120c, 1120d, 1120e, 1120f, 1120g, 1120h . . . 1120n. The cathode segments are electrically insulated from each other by insulators 1124a, 1124b, 1124c, 1124d, 1124e, 1124f, 1124g, 1124h . . . 1124n. For example, cathode segment 1120*b* is electrically insulated from cathode segment 1120*a* by insulator 1124*a* and is electrically insulated from cathode segment 1120*c* by insulator 1124*b*. In some examples, insulators 1024*a*, 1024*b*, 1024*c*, 1024*d*, 1024*e*, 1024*f*, 1024*g*, 1024*h*, . . . 1024*n* can be part of the same insulator as respective insulators 1124*a*, 1124*b*, 1124*c*, 1124*d*, 1124*e*, 1124*f*, 1124*g*, 1124*h*, . . . 1124*n*; i.e., an insulator sheet (or other configuration of an insulator) can have one end separating anode segments of anode sheet 1010 and another end separating cathode segments of cathode sheet 1110, while the insulator sheet can also separate electrolyte filler layers and separators as well, thus ensuring that no electrons, ions, and/or mass flow across the insulator.

Cathode segments 1120*a*, 1120*b*, 1120*c*, 1120*d*, 1120*e*, 1120*f*, 1120*g*, 1120*h* . . . 1120*n* are connected to cathode current collector 1130, which is segmented so that each segment of cathode current collector 1130 is connected to a corresponding segment of cathode sheet 1110. Further, each segment of cathode current collector 1130 is connected to positive electrode 1140 via a cathode current limiter (CCL). For example, FIG. 11 shows that: cathode segment 1120*a* of cathode sheet 1110 is connected to cathode current collector segment 1132*a* of cathode current collector 1130, cathode current collector segment 1132*a* is also connected to cathode current limiter 1122*a*, and cathode current limiter 1122*a* is also connected to positive electrode 1140. FIG. 11 also shows that each segment of cathode current collector 1130 is electrically insulated from other cathode current collector segments by insulators 1124*a*, 1124*b*, 1124*c*, 1124*d*, 1124*e*, 1124*f*, 1124*g*, 1124*h*, . . . 1124*n*; e.g. cathode current collector segment 1132*a* is separated by insulator 1124*a* from adjacent cathode current collector segment 1132*b*.

When battery 100 is in a normal discharge mode, electrons flow from anode sheet 1010 as electron flow 1150 to positive electrode 1140. Electrons at positive electrode 1140 then flow through cathode current limiters 1122*a*, 1122*b*, 1122*c*, 1122*d*, 1122*e*, 1122*f*, 1122*g*, 1122*h*, . . . 1122*n* to the segmented cathode current collector 1130, and then from the current collector segments to cathode segments 1120*a*, 1120*b*, 1120*c*, 1120*d*, 1120*e*, 1120*f*, 1120*g*, 1120*h*, . . . 1120*n* of cathode sheet 1110. These electron flows are illustrated in FIG. 11 by arrows from electron flow 1150 from electrical load 110 to positive electrode 1140, through to cathode current limiters 1122*a* . . . 1122*n*, continuing to cathode current collector 1130, and then to cathode segments 1120*a* . . . 1120*n* of cathode sheet 1110.

A battery cell segment of battery 100, such as a segment of battery cell 112*c*, can include an anode segment of anode sheet 1010 and cathode segment of cathode sheet 1110. For example, one battery cell segment of battery 100 can include: (a) anode segment 1020*a*, anode current collector segment 1032*a*, and anode current limiter 1022*a* that is connected to negative electrode 1040, and (b) cathode segment 1120*a*, cathode current collector segment 1132*a*, and cathode current limiter 1122*a* that is connected to positive electrode 1140. Other example battery cell segments of battery 100 can include corresponding pairs of anode and cathode segments (e.g., anode segment 1020*b* paired with cathode segment 1120*b*), pairs of anode and cathode current collector segments (e.g., the anode current collector segment attached to anode segment 1020*b* paired with the cathode current collector segment attached to cathode segment 1120*b*, and pairs of anode and cathode current limiters (e.g., anode current limiter 1022*b* paired with cathode current limiter 1122*b*), as shown in FIGS. 10 and 11.

Note that battery 100 can include separators and electrolyte fillers as shown regarding battery cell segments 114*m*, 114*n* of FIG. 1, even though FIGS. 10-13 do not show separators and electrolyte fillers regarding battery cell 112*c*. Additionally, non-electrode components of battery cell 112*c* including, but not limited to, anode sheet 1010 and cathode sheet 1110, current collectors 1030 and 1130, current limiters 1022*a*, 1022*b*, . . . 1022*n* and 1122*a*, 1122*b* . . . 1122*n*, and any separators and electrolyte fillers, can be appropriately packaged and sealed into a container such as container 128; e.g., for use as a battery cell unit. Then electrodes of battery 100, such as negative electrode 1040 and positive electrode 1140, can be at least partially outside of the container to enable electrical connections with battery cell 112*c*.

Figure 12:
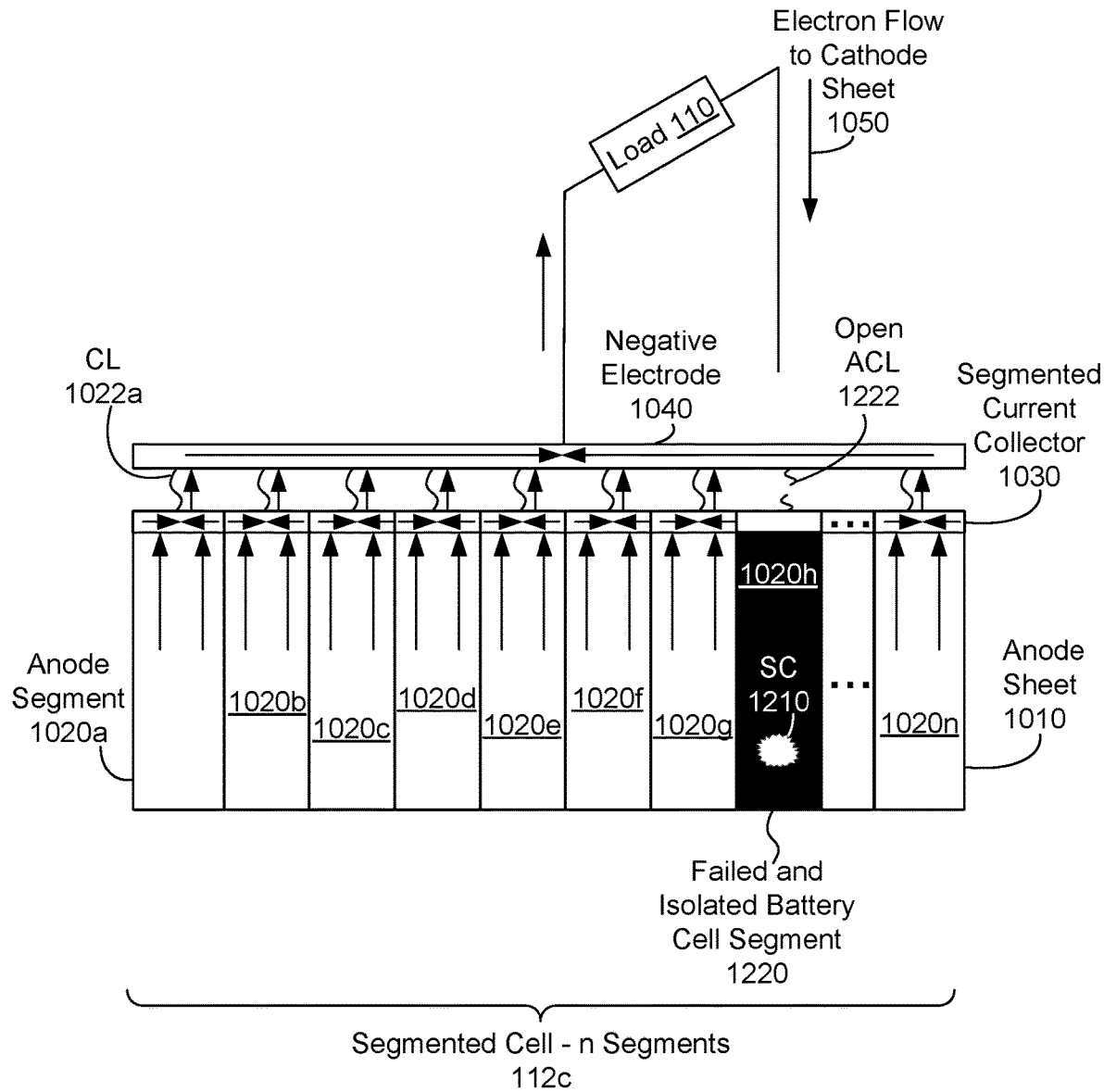
FIG. 12 is a diagram of the segmented anode sheet and the negative electrode showing an open-circuited current limiter for a failed and isolated segment of the battery cell of FIGS. 10 and 11, according to an example embodiment.

FIG. 12 is a diagram of segmented anode sheet 1010 and negative electrode 1040 showing an open anode current limiter 1222 for failed and isolated battery cell segment 1220 of battery cell 112*c*, according to an example embodiment. Open anode current limiter 1222 can include an open circuit that disables current from flowing through open anode current limiter 1222. FIG. 12 shows an example of anode sheet 1010 of battery cell 112*c* while operating in the discharge mode when an internal short circuit, shown as short channel 1210, occurs in battery cell segment 1220 that includes anode segment 1020*h*. If short channel 1210 occurs within battery cell segment 1220 while battery 100 is discharging, most, if not all, electrons flowing from anode segment 1020*h* will flow through anode current limiter 1022*h*, exceeding a maximum amount of current allowed through anode current limiter 1022*h*. Exceeding the maximum amount of current allowed can cause anode current limiter 1022*h* to open (i.e., have an open circuit) and become open anode current limiter 1222. Once anode current limiter 1022*h* opens to become open anode current limiter 1222, the open anode current limiter 1222 electrically isolates battery cell segment 1220. In the meantime, the other battery cell segments that include anode segments 1020*a*, 1020*b*, 1020*c*, 1020*d*, 1020*e*, 1020*f*, 1020*g*, and 1020*n* continue to operate normally.

Thus, the presence of short channel 1210 causes battery cell segment 1220 to fail. Further, the opening of open anode current limiter 1222 as a consequence of short channel 1210 causes battery cell segment 1220 to be electrically isolated. As such, open anode current limiter 1222 can conditionally electrically isolate battery cell segment 1220 based on an occurrence of a short circuit within battery cell segment 1220, such the occurrence of short channel 1210 in battery cell segment 1220.

Figure 13:
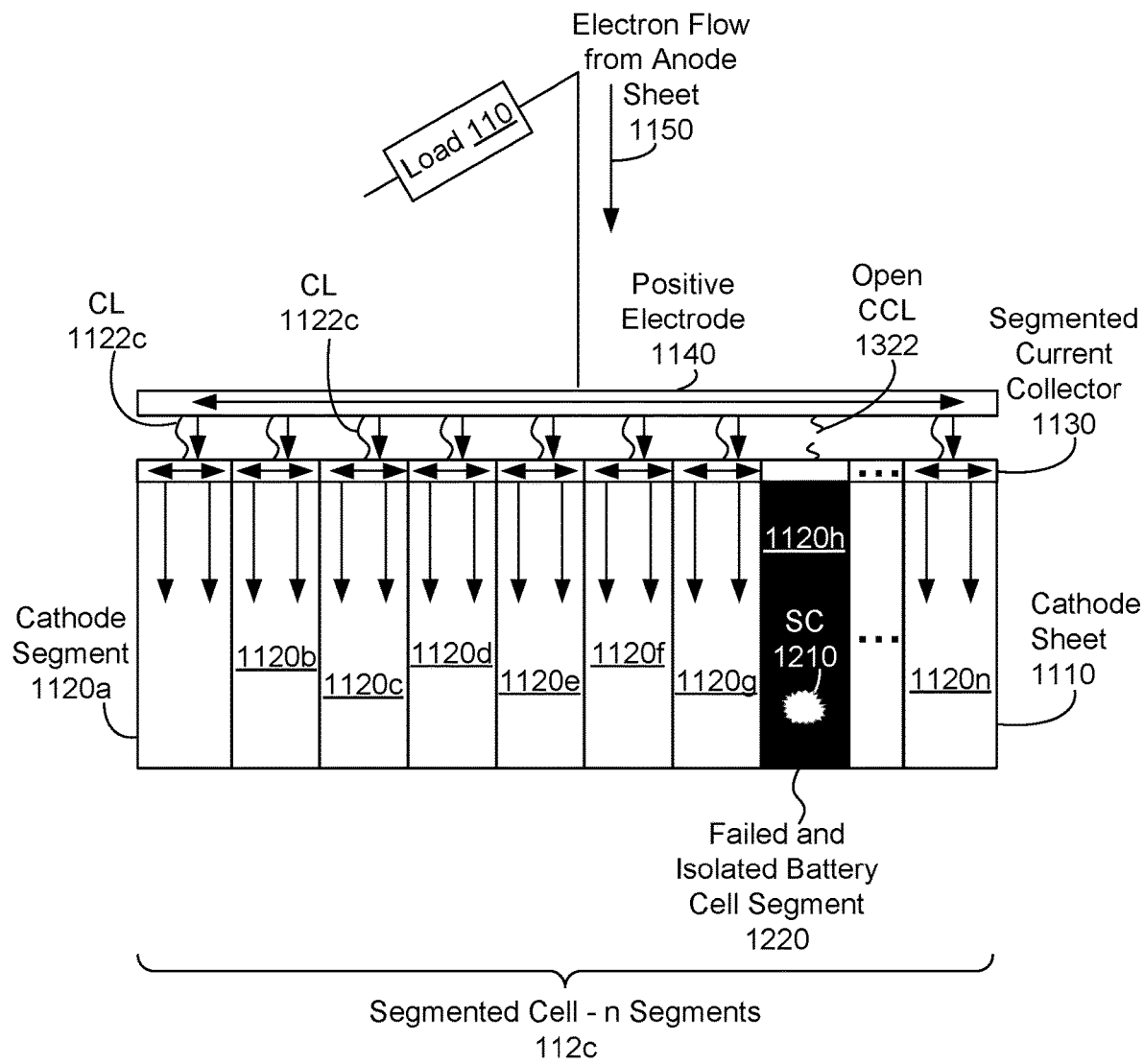
FIG. 13 is a diagram of the segmented cathode sheet and the positive electrode showing an open-circuited current limiter for a failed and isolated segment of the battery cell of FIGS. 10 and 11, according to an example embodiment.

FIG. 13 is a diagram of segmented cathode sheet 1110 and positive electrode 1140 showing an open cathode current limiter 1322 for failed and isolated battery cell segment 1220 of battery cell 112*c*, according to an example embodiment. Open cathode current limiter 1322 can include an open circuit that disables current from flowing through open cathode current limiter 1322. FIG. 13 shows an example of cathode sheet 1110 of battery cell 112*c* while operating in the discharge mode when an internal short circuit, shown as short channel 1210, occurs in battery cell segment 1220 that includes cathode segment 1120*h*. If short channel 1210 occurs within battery cell segment 1220 while battery 100 is discharging, most, if not all, electrons flowing to cathode segment 1120*h* will flow through cathode current limiter 1122*h*, exceeding a maximum amount of current allowed through cathode current limiter 1122*h*. Exceeding the maximum amount of current allowed can cause cathode current limiter 1122*h* to open and become open cathode current limiter 1322. Once cathode current limiter 1122h opens to become open cathode current limiter 1322, the open cathode current limiter 1322 electrically isolates battery cell segment 1220. In the meantime, the other battery cell segments that include cathode segments 1120a, 1120b, 1120c, 1120d, 1120e, 1120f, 1120g, and 1120n can continue to operate normally.

Thus, the presence of short channel 1210 causes battery cell segment 1220 to fail. Further, the opening of open anode current limiter 1322 as a consequence of short channel 1210 causes battery cell segment 1220 to be electrically isolated. As such, open cathode current limiter 1322 can conditionally electrically isolate battery cell segment 1220 based on an occurrence of a short circuit within battery cell segment 1220, such the occurrence of short channel 1210 in battery cell segment 1220.

Further, battery 100 can recover from a short channel being formed in one (or in other cases, multiple) faulty battery cell segment(s) by opening current limiters of the faulty battery cell segment(s), such as open anode current limiter 1222 and/or open cathode current limiter 1322 of battery cell segment 1220, while any non-faulty battery cell segments can continue to operate normally. As such, battery 100 likely can provide at least a limited amount of power even if a fault occurs, such as a short channel or other short circuit. Additionally, as faulty battery cell segment 1220 is electrically isolated from other battery cell segments, the likelihood that short channel 1210 will expand to other battery cell segments of battery 100 is reduced.

FIG. 14 is a flowchart of method 1400 for storing electrical power using a battery, according to an example embodiment. Method 1400 can be carried out using a segmented battery such as battery 100. Method 1400 can begin at block 1410, where a battery can store electrical power. The battery can include one or more cells. Each cell can include a plurality of battery cell segments, where each battery cell segment can include: an anode segment, a cathode segment, and one or more current limiters, such as discussed above in the context of at least FIGS. 1 and 10-13.

In some embodiments, a current limiter of the one or more current limiters can include a fuse, such as discussed above in the context of at least FIG. 1. In other embodiments, the one or more current limiters can include at least one of: a current limiter electrically connected to the anode segment and a current limiter electrically connected to the cathode segment, such as discussed above in the context of at least FIGS. 1 and 10-13.

In still other embodiments, each battery cell segment can further include one or more current collectors, such as discussed above in the context of at least FIGS. 1 and 10-13. In some of these embodiments, the one or more current collectors can include at least one of: an anode current collector electrically connected to the anode segment and a cathode current collector electrically connected to the cathode segment, such as discussed above in the context of at least FIGS. 1 and 10-13. In still other of these embodiments, a particular current collector of the one or more current collectors can be electrically connected to an electrode, such as discussed above in the context of at least FIGS. 1 and 10-13. In particular, the particular current collector can be electrically connected to the electrode using a particular current limiter of the one or more current limiters, such as discussed above in the context of at least FIGS. 1 and 10-13. In further embodiments, each battery cell segment can further include a current collector of the one or more current collectors electrically connected to a current limiter of the one or more current limiters, such as discussed above in the context of at least FIGS. 1 and 10-13. In particular, each battery cell segment can further include an anode current collector electrically connected to the anode sheet; and an anode current limiter electrically connected to the anode current collector, such as discussed above in the context of at least FIGS. 1, 10, and 12. In still further embodiments, each battery cell segment can further include a cathode current collector electrically connected to the cathode sheet and a cathode current limiter electrically connected to the cathode current collector, such as discussed above in the context of at least FIGS. 1, 11, and 13.

At block 1420, a particular battery cell segment can be conditionally electrically isolated based on an occurrence of a short circuit within the particular battery cell segment, such as discussed above in the context of at least FIGS. 1, 12, and 13.

In some embodiments, conditionally electrically isolating the particular battery cell segment can include conditionally electrically isolating the particular battery cell segment using a current limiter electrically connected to the anode segment of the particular battery cell segment, such as discussed above in the context of at least FIGS. 1 and 12.

In other embodiments, conditionally electrically isolating the particular battery cell segment can include conditionally electrically isolating the particular battery cell segment using a current limiter electrically connected to the cathode segment of the particular battery cell segment, such as discussed above in the context of at least FIGS. 1 and 13.

In further embodiments, method 1400 can further electrically isolating the particular battery cell segment from one or more other battery cell segments of the plurality of battery cell segments using one or more insulator sheets, such as discussed above in the context of at least FIGS. 1, 12, and 13.

In yet other embodiments, method 1400 can further include: electrically connecting at least two battery cell segments of the plurality of battery cell segments using one or more electrodes, such as discussed above in the context of at least FIGS. 1 and 10-13. In particular, a particular battery cell segment of the at least two battery cell segments can include at least one of: an anode current collector electrically connected to the anode segment and to a negative electrode of the one or more electrodes; and a cathode current collector electrically connected to the cathode segment and to a positive electrode of the one or more electrodes, such as discussed above in the context of at least FIGS. 1 and 10-13. In further examples, the anode current collector can be electrically connected to the negative electrode via an anode current limiter of the one or more current limiters; and the cathode current collector can be electrically connected to the positive electrode via a cathode current limiter of the one or more current limiters, such as discussed above in the context of at least FIGS. 1 and 10-13.

FIG. 15 is a flowchart of method 1500 for providing electrical power using a battery, according to an example embodiment. Method 1500 can be carried out using a segmented battery such as battery 100. Method 1500 can begin at block 1510, where a battery can provide electrical power to a load. The battery can include one or more cells. Each cell can include a plurality of battery cell segments, where each battery cell segment can include: an anode segment, a cathode segment, and one or more current limiters, such as discussed above in the context of at least FIGS. 1 and 10-13.

In some embodiments, a current limiter of the one or more current limiters can include a fuse, such as discussed above in the context of at least FIG. 1. In other embodiments, the one or more current limiters can include at least one of: a current limiter electrically connected to the anode segment and a current limiter electrically connected to the cathode segment, such as discussed above in the context of at least FIGS. 1 and 10-13.

In still other embodiments, each battery cell segment can further include one or more current collectors, such as discussed above in the context of at least FIGS. 1 and 10-13. In some of these embodiments, the one or more current collectors can include at least one of: an anode current collector electrically connected to the anode segment and a cathode current collector electrically connected to the cathode segment, such as discussed above in the context of at least FIGS. 1 and 10-13.

In further examples, a particular current collector of the one or more current collectors can be electrically connected to an electrode, such as discussed above in the context of at least FIGS. 1 and 10-13. In additional examples, the particular current collector can be electrically connected to the electrode using a particular current limiter of the one or more current limiters, such as discussed above in the context of at least FIGS. 1 and 10-13.

In further examples, each battery cell segment can further include a current collector of the one or more current collectors electrically connected to a current limiter of the one or more current limiters, such as discussed above in the context of at least FIGS. 1 and 10-13. In particular, each battery cell segment can further include an anode current collector electrically connected to the anode sheet; and an anode current limiter electrically connected to the anode current collector, such as discussed above in the context of at least FIGS. 1, 10, and 12. Each battery cell segment can further include a cathode current collector electrically connected to the cathode sheet and a cathode current limiter electrically connected to the cathode current collector, such as discussed above in the context of at least FIGS. 1, 11, and 13.

At block 1520, a particular battery cell segment can be conditionally electrically isolated based on an occurrence of a short circuit within the particular battery cell segment, such as discussed above in the context of at least FIGS. 1, 12, and 13.

In some embodiments, conditionally electrically isolating the particular battery cell segment can include conditionally electrically isolating the particular battery cell segment using one of: a current limiter electrically connected to the anode segment of the particular battery cell segment, and a current limiter electrically connected to the cathode segment of the particular battery cell segment, such as discussed above in the context of at least FIGS. 1, 12, and 13.

Segmented Batteries with PTC Materials

Figure 16:
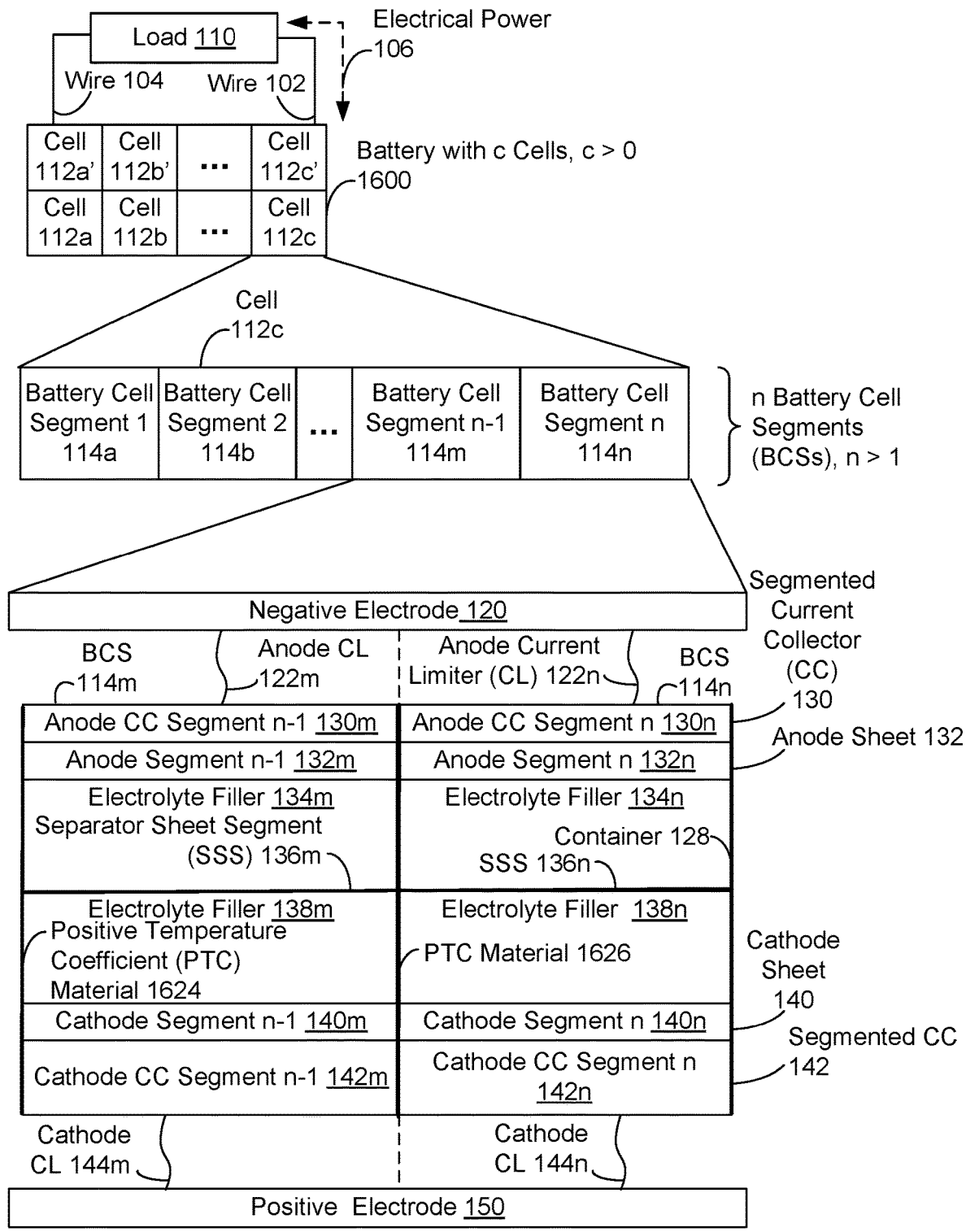
FIG. 16 is a block diagram of a battery and an electrical load, according to an example embodiment.

FIG. 16 is a block diagram of a battery 1600 and an electrical load 110, according to an example embodiment. Segmented batteries, such as battery 1600, can utilize positive temperature coefficient (PTC) materials in their construction. A positive temperature coefficient material is a material that has one or more properties; e.g., electrical resistance, which increase when the material's temperature is increased. Example PTC materials whose electrical resistances increase when the PTC material's temperature increases include, but are not limited to, a thermoplastic polymer (i.e., "PTC rubber"), barium titanate, barium carbonate, and titanium oxide.

In the construction of a segmented battery, a PTC material of battery 1600 can replace and/or be included with insulator materials, such as insulators 124 and 126 of battery 100. In some cases, the PTC material of battery 1600 can also include one or more active materials to increase battery cell energy density. An active material can include positively charged material or negatively charged material, where positively charged material is termed cathode active material herein, and where negatively charged material is termed cathode active material herein. Example cathode active materials include, but are not limited to, lithium cobalt oxide ($LiCoO_2$), lithium cobalt phosphate ($LiCoPO_4$), lithium iron oxide ($LiFeO_2$), lithium iron phosphate ($LiFePO_4$), lithium iron silicate ($Li_2FeSiO_4$), lithium manganese dioxide ($LiMnO_2$), lithium manganese nickel oxide ($Li_2Mn_3NiO_8$), and lithium manganese nickel oxide ($Li_2Mn_3NiO_8$). Example cathode active materials include, but are not limited to, graphite and lithium titanate ($Li_4Ti_5O_{12}$). For example, in a cathode segment of a segmented battery, a sheet, layer, and/or other arrangement of PTC material can be used with a mix of PTC material and one or more cathode active materials. As another example, in an anode segment of a segmented battery, a sheet, layer, and/or other arrangement of PTC material can be used with a mix of PTC material and one or more anode active materials.

To determine a mix of PTC material with one or more cathode active materials for a battery cell a mass ratio of PTC materials can be determined where the mass ratio of PTC materials is sufficiently high such that an average resistivity $\rho_{av}$ of PTC and cathode materials at a critical temperature $T_c$ is no larger than a critical resistivity $\rho_c$. The critical temperature $T_c$ can be a temperature value below which the battery cell operates normally and above which the battery cell may experience an accelerated degradation and/or an internal short circuit; i.e., a short channel may be formed in the battery cell.

The critical temperature $T_c$ can be experimentally determined. Once $T_c$ is determined, a critical resistivity $\rho_{c\_cathode}$ of a mix of PTC and cathode active materials; e.g., for use in a cathode segment of a segmented battery cell, can be determined using Inequality (1) below:

$$\rho_{av}(T_c) = \frac{\rho_{ptc}(T_c) \cdot M_{ptc} + \rho_{cathode}(T_c) \cdot M_{cathode}}{M_{ptc} + M_{cathode}} \leq \rho_{c\_cathode} \quad (1)$$

where:
$\rho_{ptc}(T_c)$ is: a resistivity of the PTC material in the mix at the critical temperature $T_c$,
$M_{ptc}$ is a mass ratio of the PTC material in the mix,
$\rho_{cathode}(T_c)$ is a resistivity of the cathode material in the mix at the critical temperature $T_c$, and
$M_{cathode}$ is a mass ratio of the cathode material in the mix.

Also, a critical resistivity $\rho_{c\_anode}$ of a mix of PTC and anode active materials; e.g., for use in an anode segment of a segmented battery cell, can be determined using Inequality (2) below:

$$\rho_{av}(T_c) = \frac{\rho_{ptc}(T_c) \cdot M_{ptc} + \rho_{anode}(T_c) \cdot M_{anode}}{M_{ptc} + M_{anode}} \leq \rho_{c\_anode} \quad (2)$$

where:
$\rho_{ptc}(T_c)$ is a resistivity of the PTC material in the mix at the critical temperature $T_c$,
$M_{ptc}$ is a mass ratio of the PTC material in the mix,
$\rho_{anode}(T_c)$ is a resistivity of the anode material in the mix at the critical temperature $T_c$ and
$M_{anode}$ is a mass ratio of the anode material in the mix.

The use of PTC materials whose electrical resistance increases with temperature to separate battery segments can provide increased electrical resistance between battery segments as temperatures increase. As a battery segment typically increases in temperature when the battery segment faults, the use of PTC materials to separate battery segments enhances battery segment protection during faults. Addition of active materials to PTC materials can allow for partial replacement of active materials removed by PTC layers, thereby increasing battery cell energy density. In some cases, use of PTC materials mixed with active materials can maintain (or even increase) battery cell energy density while providing enhanced electrical resistance between segments during battery faults.

Battery 1600 of FIG. 16 is closely related to battery 100 discussed above and depicted in at least FIG. 1. Unless explicitly stated otherwise below, battery 1600 performs the same functionality as described for battery 100; e.g., both batteries 100 and 1600 can operate in a charge mode to draw electrical power from a source and can operate in a discharge mode to provide electrical power to an electrical load. And, unless explicitly stated otherwise below, each component sharing a common reference number for battery 100 and battery 1600 performs the same functionality as described above in the context of battery 100; e.g., negative electrode 120 performs the same functionality for both batteries 100 and 1600.

Like battery 100, battery 1600 can include c cells, c>0, such as cells 112a', 112a, 112b', 112b . . . 112c', 112c which can be connected in series and/or parallel. Also like battery 100, at least one of cells 112a', 112a, 112b', 112b . . . 112c', 112c of battery 1600 can include two or more battery cell segments. For example, an upper-central portion of FIG. 16 shows that cell 112c of battery 1600 is made up of n battery cell segments, n>1, which include battery cell segments 114a, 114b . . . 114m, 114n. As such, battery 1600 can include a plurality of battery cell segments; e.g., battery cell segments 114a, 114b, . . . 114m, 114n of cell 112c and battery cell segments in cells 112a', 112a, 112b', 112b, . . . (not shown in FIG. 16).

A lower portion of FIG. 16 shows a top view of neighboring battery cell segments 114m and 114n of battery 1600. Battery cell segments 114m and 114n of battery 1600 are similar to battery cell segments 114m and 114n described above in the context of battery 100. However, battery cell segments 114m and 114n of battery 1600 are separated by one or more layers of PTC material 1626, while corresponding battery cell segments 114m and 114n of battery 100 are separated by insulator 126.

PTC material 1626 can include PTC materials, anode active materials, and/or cathode active materials. For example, a portion of PTC material 1626 shown above separator sheet segments (SSSs) 136m, 136n in FIG. 16 can be part of and/or separate one or more anode segments. Then, the portion of PTC material 1626 shown above separator sheet segments 136m, 136n may include PTC material and perhaps anode active material. Similarly, a portion of PTC material 1626 shown below separator sheet segments 136m, 136n can be part of and/or separate one or more cathode segments, and so the portion of PTC material 1626 shown below separator sheet segments 136m, 136n can include PTC material and perhaps cathode active material.

Figure 17:
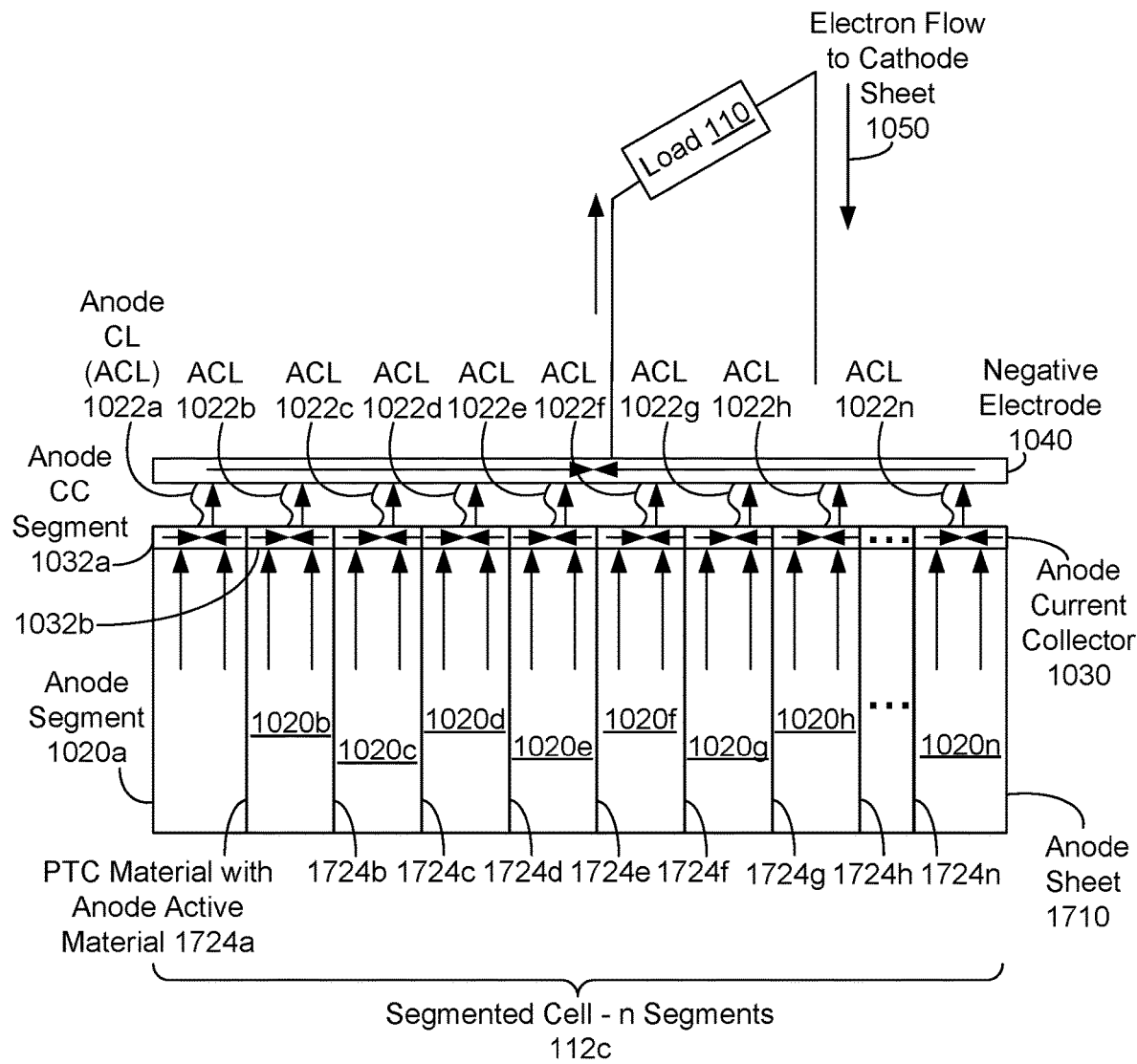
FIG. 17 is a diagram of a segmented anode sheet and a negative electrode of a battery cell of the battery of FIG. 16, according to an example embodiment.

FIG. 17 is a diagram of a segmented anode sheet 1710 and a negative electrode 1040 of a battery cell 112c of battery 1600, according to an example embodiment. As also indicated in FIG. 16, battery cell 112c of battery 1600 has n battery cell segments, n>1. Segmented anode sheet 1710 is closely related to segmented anode sheet 1010 discussed above and depicted in at least FIG. 10. Unless explicitly stated otherwise below, each component sharing a common reference number for segmented anode sheet 1010 and segmented anode sheet 1710 performs the same functionality as described above in the context of segmented anode sheet 1010; e.g., negative electrode 1040 performs the same functionality for segmented anode sheet 1710 as performed for segmented anode sheet 1010

While segmented anode sheet 1710 is similar to and performs similar functionality to segmented anode sheet 1010, segmented anode sheet 1710 does differ from segmented anode sheet 1010. For example, anode segments of segmented anode sheet 1710 are electrically insulated from each other by PTC and anode active materials, while anode segments of segmented anode sheet 1010 are electrically insulated from each other by insulators. In particular, anode segments of segmented anode sheet 1710 are electrically insulated from each other by PTC materials with anode active materials 1724a, 1724b, 1724c, 1724d, 1724e, 1724f, 1724g, 1724h . . . 1724n. For example, anode segment 1020b of segmented anode sheet 1710 is electrically insulated from anode segment 1020a of segmented anode sheet 1710 by PTC material with anode active material 1724a and is electrically insulated from anode segment 1020c of segmented anode sheet 1710 by PTC material with anode active material 1724b. In some embodiments, some or all of PTC materials with anode active materials 1724a, 1724b, 1724c, 1724d, 1724e, 1724f, 1724g, 1724h . . . 1724n do not include anode active materials; that is, some or all of 1724a, 1724b, 1724c, 1724d, 1724e, 1724f, 1724g, 1724h . . . 1724n only have PTC material.

Figure 18:
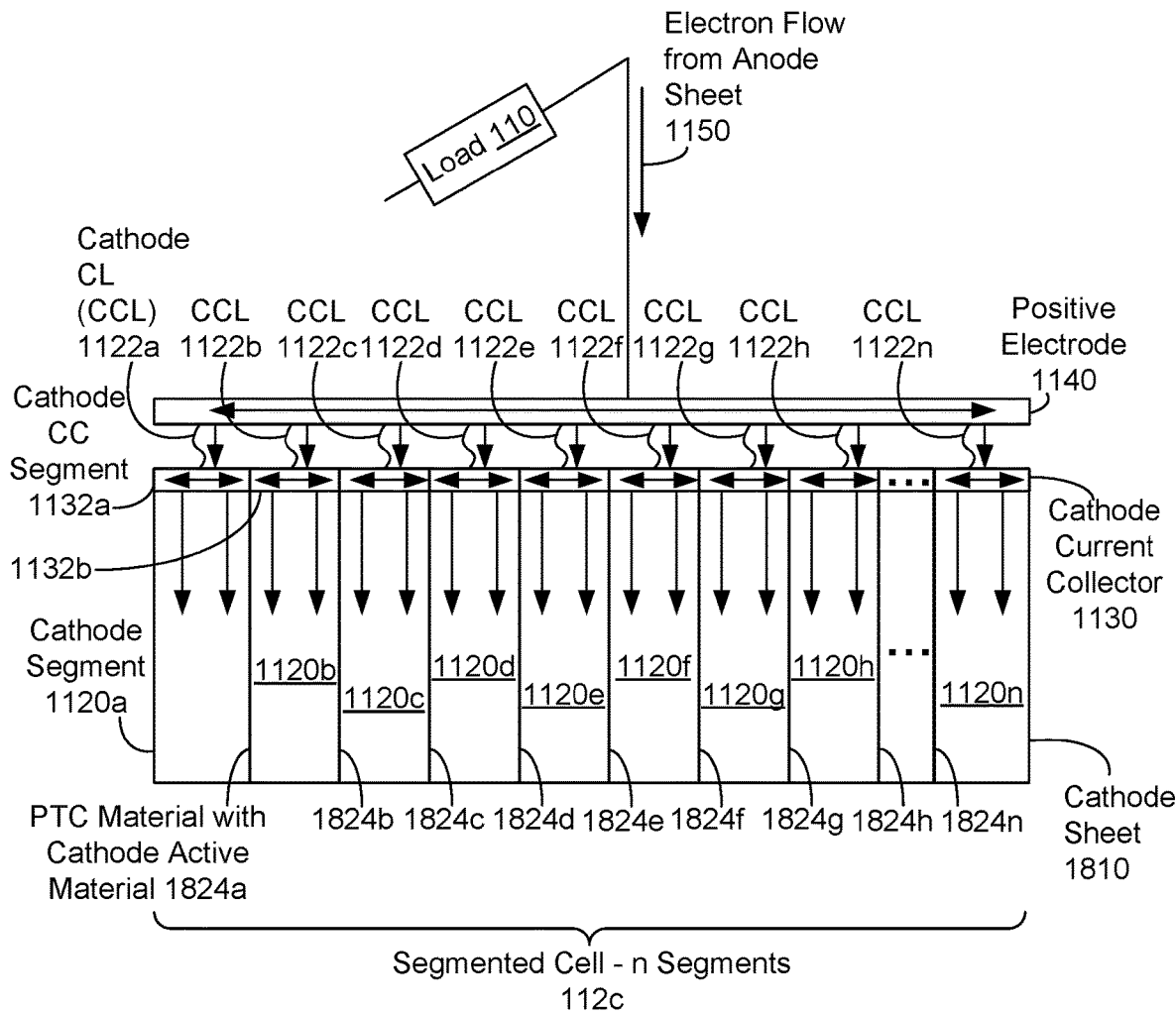
FIG. 18 is a diagram of a segmented cathode sheet and a positive electrode of the battery cell of FIG. 17, according to an example embodiment.

FIG. 18 is a diagram of a segmented cathode sheet 1810 and a positive electrode 1140 of battery cell 112c of battery 1600, according to an example embodiment. As also indicated in FIGS. 16 and 17, battery cell 112c of battery 1600 has n battery cell segments, n>1. Segmented cathode sheet 1810 is closely related to segmented cathode sheet 1110 discussed above and depicted in at least FIG. 11. Unless explicitly stated otherwise below, each component sharing a common reference number for segmented cathode sheet 1110 and segmented cathode sheet 1810 performs the same functionality as described above in the context of segmented cathode sheet 1110; e.g., positive electrode 1140 performs the same functionality for segmented cathode sheet 1810 as performed for segmented cathode sheet 1110.

In particular, current limiters of battery 1600 perform the same functionality for segmented anode sheet 1710 and segmented cathode sheet 1810 as discussed above for respective segmented anode sheet 1010 and segmented cathode sheet 1110 of battery 100. Further, if a short channel occurs within a particular battery cell segment of battery 1600 while battery 1600 is discharging, an anode current limiter and/or a cathode current limiter of the particular battery cell segment of battery 1600 can be caused to open, thereby conditionally electrically isolating the particular battery cell segment in the same fashion discussed above in at least in the context of battery 100 and FIGS. 12 and 13. Further, battery cell segments of battery 1600 other than the particular battery cell segment can continue to operate normally in the same fashion discussed above in at least in the context of battery 100 and FIGS. 12 and 13.

While segmented cathode sheet 1810 is similar to and performs similar functionality to segmented cathode sheet 1110, segmented cathode sheet 1810 does differ from segmented cathode sheet 1110. For example, cathode segments of segmented cathode sheet 1810 are electrically insulated from each other by PTC and cathode active materials, while cathode segments of segmented cathode sheet 1110 are electrically insulated from each other by insulators. In particular, cathode segments of segmented cathode sheet 1810 are electrically insulated from each other by PTC materials with cathode active materials 1824a, 1824b, 1824c, 1824d, 1824e, 1824f, 1824g, 1824h . . . 1824n. For example, cathode segment 1120b of segmented cathode sheet 1810 is electrically insulated from cathode segment 1120a of segmented cathode sheet 1810 by PTC material with cathode active material 1824a and is electrically insulated from cathode segment 1120c of segmented cathode sheet 1810 by PTC material with cathode active material 1824b. In some embodiments, some or all of PTC materials with cathode active materials 1824a, 1824b, 1824c, 1824d, 1824e, 1824f, 1824g, 1824h . . . 1824n do not include cathode active materials; that is, some or all of 1824a, 1824b, 1824c, 1824d, 1824e, 1824f, 1824g, 1824h . . . 1824n only have PTC material.

In some examples, PTC materials with cathode active materials 1824a, 1824b, 1824c, 1824d, 1824e, 1824f, 1824g, 1824h . . . 1824n of segmented cathode sheet 1810 can be part of the PTC material as respective PTC material with anode active material 1724a, 1724b, 1724c, 1724d, 1724e, 1724f, 1724g, 1724h . . . 1724n of segmented anode sheet 1710; i.e., a sheet, layer, and/or other configuration of PTC material can have one end separating anode segments of segmented anode sheet 1710 and another end separating cathode segments of segmented cathode sheet 1810. The PTC material sheet can also separate electrolyte filler layers and separators as well, thus ensuring that no electrons, ions, and/or mass flow across the PTC material. In some of these examples, the end of the PTC material sheet separating anode segments of segmented anode sheet 1710 includes anode active materials and/or the end of the PTC material sheet separating cathode segments of segmented cathode sheet 1810 includes cathode active materials.

Note that battery 1600 can include separators and electrolyte fillers as shown regarding battery cell segments 114m, 114n of FIG. 16, even though FIGS. 17 and 18 do not show separators and electrolyte fillers regarding battery cell 112c of battery 1600. Additionally, non-electrode components of battery cell 112c of battery 1600 including, but not limited to, anode sheet 1710 and cathode sheet 1810, current collectors 1030 and 1130, current limiters 1022a, 1022b, . . . 1022n and 1122a, 1122b . . . 1122n, and any separators and electrolyte fillers, can be appropriately packaged and sealed into a container such as container 128; e.g., for use as a battery cell unit. Then electrodes of battery 1600, such as negative electrode 1040 and positive electrode 1140, can be at least partially outside of the container to enable electrical connections with battery cell 112c of battery 1600.

FIG. 19 is a flowchart of method 1900 for storing electrical power using a battery, according to an example embodiment. The battery of method 1900 can be a segmented battery having PTC material; e.g., battery 1600. Method 1900 can begin at block 1910, where the battery can store electrical power. The battery includes one or more cells, each cell including a plurality of battery cell segments, where each battery cell segment includes a PTC material whose resistance increases with temperature, an anode segment, a cathode segment, and one or more current limiters, such as discussed above in the context of at least FIGS. 16-18. For example, the PTC material can be arranged in one or more sheets or layers within the battery.

In some embodiments, a current limiter of the one or more current limiters includes a fuse, such as discussed above in the context of at least FIGS. 1 and 16. In other embodiments, the one or more current limiters can include at least one of: a current limiter electrically connected to the anode segment and a current limiter electrically connected to the cathode segment, such as discussed above in the context of at least FIGS. 1, 10-13, and 16-18.

In still other embodiments, the PTC material is one or more of: thermoplastic polymer, barium titanate, barium carbonate, and titanium oxide, such as discussed above in the context of at least FIG. 16. In even other embodiments, the PTC material includes an active material. In some of these embodiments, the active material includes a cathode active material associated with the cathode segment, such as discussed above in the context of at least FIG. 16. In other of these embodiments, the cathode active material includes one or more of: a material including lithium cobalt oxide, a material including lithium cobalt phosphate, a material including lithium iron oxide, a material including lithium iron phosphate, a material including lithium iron silicate, a material including lithium manganese dioxide, a material including lithium manganese nickel oxide, and a material including lithium manganese nickel oxide, such as discussed above in the context of at least FIG. 16. In even other of these embodiments, the active material includes an anode active material associated with the anode segment, such as discussed above in the context of at least FIG. 16. In further of these embodiments, the anode active material includes one or more of: a material including graphite and a material including lithium titanate, such as discussed above in the context of at least FIG. 16.

In yet other embodiments, each battery cell segment further includes one or more current collectors, and where the one or more current collectors include at least one of: an anode current collector electrically connected to the anode segment; and a cathode current collector electrically connected to the cathode segment, such as discussed above in the context of at least FIGS. 1, 10-13, and 16-18. In some of these embodiments, each battery cell segment further includes: a current collector of the one or more current collectors electrically connected to a current limiter of the one or more current limiters, such as discussed above in the context of at least FIGS. 1, 10-13, and 16-18.

In still even other embodiments, at least two battery cell segments of the plurality of battery cell segments are electrically connected using one or more electrodes, such as discussed above in the context of at least FIGS. 1, 10-13, and 16-18. In some of these embodiments, a particular battery cell segment of the at least two battery cell segments includes at least one of: an anode current collector electrically connected to the anode segment and to a negative electrode of the one or more electrodes; and a cathode current collector electrically connected to the cathode segment and to a positive electrode of the one or more electrodes, such as discussed above in the context of at least FIGS. 1, 10-13, and 16-18. In other of these embodiments, the anode current collector is electrically connected to the negative electrode via an anode current limiter of the one or more current limiters; and the cathode current collector is electrically connected to the positive electrode via a cathode current limiter of the one or more current limiters, such as discussed above in the context of at least FIGS. 1, 10-13, and 16-18.

In yet even other of these embodiments, the anode segment is separated from the cathode segment by a separator immersed in an electrolyte filler, where the one or more current limiters are connected to the cathode segment and/or the anode segment, and where the PTC layer is positioned to separate a battery cell segment from other battery cell segments of the plurality of battery cell segments, such as discussed above in the context of at least FIGS. 16-18. For example, the separator can be made of one or more herein-described separator materials.

At block 1920, a particular battery cell segment can be conditionally electrically isolated based on an occurrence of a short circuit within the particular battery cell segment, such as discussed above in the context of at least FIG. 18. In some embodiments, conditionally electrically isolating the particular battery cell segment can include conditionally electrically isolating the particular battery cell segment using a current limiter electrically connected to the anode segment of the particular battery cell segment, such as discussed above in the context of at least FIG. 18. In other embodiments, conditionally electrically isolating the particular battery cell segment can include conditionally electrically isolating the particular battery cell segment using a current limiter electrically connected to the anode segment of the particular battery cell segment, such as discussed above in the context of at least FIG. 18.

In some embodiments, method 1900 can also include: electrically isolating the particular battery cell segment from one or more other battery cell segments of the plurality of battery cell segments using the PTC material, such as discussed above in the context of at least FIG. 18.

FIG. 20 is a flowchart of a method 2000 for providing electrical power using a battery, according to an example embodiment. The battery of method 1900 can be a segmented battery having PTC material; e.g., battery 1600. Method 2000 can begin at block 2010, where the battery can provide electrical power to a load. The battery includes one or more cells, each cell including a plurality of battery cell segments, where each battery cell segment including" a PTC material whose resistance increases with temperature, an anode segment, a cathode segment, and one or more current limiters, such as discussed above in the context of at least FIGS. 16-18. For example, the PTC material can be arranged in one or more sheets or layers within the battery.

At block 2010, a particular battery cell segment can be conditionally electrically isolated based on an occurrence of a short circuit within the particular battery cell segment, such as discussed above in the context of at least FIG. 18. In some embodiments, a current limiter of the one or more current limiters includes a fuse, such as discussed above in the context of at least FIGS. 1 and 16. In other embodiments, the one or more current limiters can include at least one of: a current limiter electrically connected to the anode segment and a current limiter electrically connected to the cathode segment, such as discussed above in the context of at least FIGS. 1, 10-13, and 16-18.

In still other embodiments, the PTC material is one or more of: thermoplastic polymer, barium titanate, barium carbonate, and titanium oxide, such as discussed above in the context of at least FIG. 16. In even other embodiments, the PTC material includes an active material. In some of these embodiments, the active material includes a cathode active material associated with the cathode segment, such as discussed above in the context of at least FIG. 16. In other of these embodiments, the cathode active material includes one or more of: a material including lithium cobalt oxide, a material including lithium cobalt phosphate, a material including lithium iron oxide, a material including lithium iron phosphate, a material including lithium iron silicate, a material including lithium manganese dioxide, a material including lithium manganese nickel oxide, and a material including lithium manganese nickel oxide, such as discussed above in the context of at least FIG. 16. In even other of these embodiments, the active material includes an anode active material associated with the anode segment, such as discussed above in the context of at least FIG. 16. In further of these embodiments, the anode active material includes one or more of: a material including graphite and a material including lithium titanate, such as discussed above in the context of at least FIG. 16.

In yet other embodiments, each battery cell segment further includes one or more current collectors, and where the one or more current collectors include at least one of: an anode current collector electrically connected to the anode segment; and a cathode current collector electrically connected to the cathode segment, such as discussed above in the context of at least FIGS. 1, 10-13, and 16-18. In some of these embodiments, each battery cell segment further includes: a current collector of the one or more current collectors electrically connected to a current limiter of the one or more current limiters, such as discussed above in the context of at least FIGS. 1, 10-13, and 16-18.

In still even other embodiments, at least two battery cell segments of the plurality of battery cell segments are electrically connected using one or more electrodes, such as discussed above in the context of at least FIGS. 1, 10-13, and 16-18. In some of these embodiments, a particular battery cell segment of the at least two battery cell segments includes at least one of: an anode current collector electrically connected to the anode segment and to a negative electrode of the one or more electrodes; and a cathode current collector electrically connected to the cathode segment and to a positive electrode of the one or more electrodes, such as discussed above in the context of at least FIGS. 1, 10-13, and 16-18. In other of these embodiments, the anode current collector is electrically connected to the negative electrode via an anode current limiter of the one or more current limiters; and the cathode current collector is electrically connected to the positive electrode via a cathode current limiter of the one or more current limiters, such as discussed above in the context of at least FIGS. 1, 10-13, and 16-18.

In yet even other of these embodiments, the anode segment is separated from the cathode segment by a separator immersed in an electrolyte filler, where the one or more current limiters are connected to the cathode segment and/or the anode segment, and where the PTC layer is positioned to separate a battery cell segment from other battery cell segments of the plurality of battery cell segments, such as discussed above in the context of at least FIGS. 16-18. For example, the separator can be made of one or more herein-described separator materials.

At block 2020, a particular battery cell segment can be conditionally electrically isolated based on an occurrence of a short circuit within the particular battery cell segment, such as discussed above in the context of at least FIG. 18. In some embodiments, conditionally electrically isolating the particular battery cell segment can include conditionally electrically isolating the particular battery cell segment using a current limiter electrically connected to the anode segment of the particular battery cell segment, such as discussed above in the context of at least FIG. 18. In other embodiments, conditionally electrically isolating the particular battery cell segment can include conditionally electrically isolating the particular battery cell segment using a current limiter electrically connected to the anode segment of the particular battery cell segment, such as discussed above in the context of at least FIG. 18.

In some embodiments, method 2000 can also include: electrically isolating the particular battery cell segment from one or more other battery cell segments of the plurality of battery cell segments using the PTC material, such as discussed above in the context of at least FIG. 18.

Disclosed embodiments are described above with reference to the accompanying drawings, in which some, but not all of the disclosed embodiments may be shown. Indeed, several different embodiments may be described and should not be construed as limited to the embodiments set forth herein. Rather, these embodiments are described so that this disclosure are thorough and complete and convey the disclosure at least to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

While various aspects and embodiments have been disclosed herein, other aspects and embodiments will be apparent to those skilled in the art.

What is claimed is:

1. A battery, comprising:
  one or more cells, each cell comprising a plurality of battery cell segments electrically connected in parallel within the cell to electrodes, each battery cell segment comprising:
    a positive temperature coefficient (PTC) material whose resistance increases with temperature,
    an anode segment,
    a cathode segment, and
    one or more current limiters configured to conditionally electrically isolate the battery cell segment based on an occurrence of a short circuit within the battery cell segment, wherein the anode segment is separated from the cathode segment by a separator immersed in an electrolyte filler, wherein the one or more current limiters are connected to the cathode segment and/or the anode segment, and wherein the PTC material is positioned to separate a battery cell segment from other battery cell segments of the plurality of battery cell segments.

2. The battery of claim 1, wherein a current limiter of the one or more current limiters comprises a fuse.

3. The battery of claim 1, wherein the PTC material is one or more of: thermoplastic polymer, barium titanate, barium carbonate, and titanium oxide.

4. The battery of claim 1, wherein the PTC material further includes an active material.

5. The battery of claim 4, wherein the active material comprises a cathode active material associated with the cathode segment.

6. The battery of claim 5, wherein the cathode active material comprises one or more of: a material including lithium cobalt oxide, a material including lithium cobalt phosphate, a material including lithium iron oxide, a material including lithium iron phosphate, a material including lithium iron silicate, a material including lithium manganese dioxide, a material including lithium manganese nickel oxide, and a material including lithium manganese nickel oxide.

7. The battery of claim 4, wherein the active material comprises an anode active material associated with the anode segment.

8. The battery of claim 7, wherein the anode active material comprises one or more of: a material including graphite and a material including lithium titanate.

9. The battery of claim 1, wherein each battery cell segment further comprises one or more current collectors, and wherein the one or more current collectors comprise at least one of:
  an anode current collector electrically connected to the anode segment; and
  a cathode current collector electrically connected to the cathode segment.

10. The battery of claim 9, wherein each battery cell segment further comprises:
  a current collector of the one or more current collectors electrically connected to a current limiter of the one or more current limiters.

11. The battery of claim 1, wherein a particular battery cell segment of the at least two battery cell segments comprises at least one of:
  an anode current collector electrically connected to the anode segment and to a negative electrode of the one or more electrodes; and
  a cathode current collector electrically connected to the cathode segment and to a positive electrode of the one or more electrodes.

12. The battery of claim 11, wherein the anode current collector is electrically connected to the negative electrode via an anode current limiter of the one or more current limiters; and
  wherein the cathode current collector is electrically connected to the positive electrode via a cathode current limiter of the one or more current limiters.

13. A battery, comprising:
  one or more cells, each cell comprising a plurality of battery cell segments electrically connected in parallel within the cell to electrodes, each battery cell segment comprising:
    a positive temperature coefficient (PTC) material whose resistance increases with temperature,
    an anode segment,
    a cathode segment, and
    one or more current limiters configured to conditionally electrically isolate the battery cell segment based on an occurrence of a short circuit within the battery cell segment, wherein the PTC material is positioned to separate a battery cell segment from other battery cell segments of the plurality of battery cell segments.

14. The battery of claim 13, further comprising:
  multiple layers of PTC material positioned to separate neighboring battery cell segments.

15. The battery of claim 13, further comprising:
  an insulator material positioned to separate a battery cell segment from a neighboring battery cell segment in each cell.

16. The battery of claim 13, wherein a current limiter of the one or more current limiters comprises a fuse.

17. The battery of claim 13, wherein the PTC material is one or more of: thermoplastic polymer, barium titanate, barium carbonate, and titanium oxide.

18. The battery of claim 13, wherein the PTC material further includes an active material.

19. The battery of claim 18, wherein the active material comprises a cathode active material associated with the cathode segment.

20. The battery of claim 18, wherein the active material comprises an anode active material associated with the anode segment.

* * * * *